US010051071B2

(12) United States Patent
Wood et al.

(10) Patent No.: US 10,051,071 B2
(45) Date of Patent: Aug. 14, 2018

(54) METHOD AND SYSTEM FOR COLLECTING HISTORICAL NETWORK INFORMATION IN A CONTENT CENTRIC NETWORK

(71) Applicant: CISCO TECHNOLOGY, INC., San Jose, CA (US)

(72) Inventors: Christopher A. Wood, San Francisco, CA (US); Ignacio Solis, Scotts Valley, CA (US); Andriana Ioannou, Thessaloniki (GR); Glenn C. Scott, Portola Valley, CA (US)

(73) Assignee: Cisco Technology, Inc., San Jose, CA (US)

( * ) Notice: Subject to any disclaimer, the term of this patent is extended or adjusted under 35 U.S.C. 154(b) by 116 days.

(21) Appl. No.: 15/061,817

(22) Filed: Mar. 4, 2016

(65) Prior Publication Data
US 2017/0257444 A1    Sep. 7, 2017

(51) Int. Cl.
*G06F 15/173*    (2006.01)
*H04L 29/08*    (2006.01)
(Continued)

(52) U.S. Cl.
CPC .......... *H04L 67/22* (2013.01); *H04L 43/0876* (2013.01); *H04L 45/00* (2013.01); *H04L 69/02* (2013.01)

(58) Field of Classification Search
USPC ....... 709/203, 206, 217, 219, 223, 224, 226, 709/228, 231, 232, 238
See application file for complete search history.

(56) References Cited

U.S. PATENT DOCUMENTS

| 817,441 A | 4/1906 | Niesz |
|---|---|---|
| 4,309,569 A | 1/1982 | Merkle |

(Continued)

FOREIGN PATENT DOCUMENTS

| CN | 103873371 | 6/2014 |
|---|---|---|
| DE | 1720277 A1 | 6/1967 |

(Continued)

OTHER PUBLICATIONS

Marc Mosko: "CCNx 1.0 Protocol Introduction" Apr. 2, 2014 [Retrieved from the Internet Jun. 8, 2016] http://www.ccnx.org/pubs/hhg/1.1%20CCNx%201.0%20Protocol%20Introduction.pdf *paragraphs [01.3], [002], [02.1], [0003].
(Continued)

*Primary Examiner* — Quang N Nguyen

(57) ABSTRACT

One embodiment provides a system that facilitates collection of historical network information. During operation, the system monitors a plurality of packets which include outgoing interests and corresponding incoming content objects, wherein a name for an interest is a hierarchically structured variable length identifier that includes contiguous name components ordered from a most general level to a most specific level. The system collects historical information associated with the packets based on name prefixes of the packets, wherein a name prefix includes one or more contiguous name components. In response to receiving a query from a requesting entity for the historical information, the system transmits the historical information, thereby facilitating the requesting entity to use the historical information to increase network efficiency.

20 Claims, 9 Drawing Sheets

(51) Int. Cl.
  *H04L 12/26* (2006.01)
  *H04L 12/701* (2013.01)
  *H04L 29/06* (2006.01)

(56) References Cited

U.S. PATENT DOCUMENTS

| | | | |
|---|---|---|---|
| 4,921,898 A | 5/1990 | Lenney |
| 5,070,134 A | 12/1991 | Oyamada |
| 5,110,856 A | 5/1992 | Oyamada |
| 5,214,702 A | 5/1993 | Fischer |
| 5,377,354 A | 12/1994 | Scannell |
| 5,506,844 A | 4/1996 | Rao |
| 5,629,370 A | 5/1997 | Freidzon |
| 5,649,109 A | 7/1997 | Griesmer |
| 5,845,207 A | 12/1998 | Amin |
| 5,870,605 A | 2/1999 | Bracho |
| 6,021,464 A | 2/2000 | Yao |
| 6,047,331 A | 4/2000 | Medard |
| 6,052,683 A | 4/2000 | Irwin |
| 6,085,320 A | 7/2000 | Kaliski, Jr. |
| 6,091,724 A | 7/2000 | Chandra |
| 6,128,623 A | 10/2000 | Mattis |
| 6,128,627 A | 10/2000 | Mattis |
| 6,173,364 B1 | 1/2001 | Zenchelsky |
| 6,182,133 B1 | 1/2001 | Horvitz |
| 6,209,003 B1 | 3/2001 | Mattis |
| 6,226,618 B1 | 5/2001 | Downs |
| 6,233,617 B1 | 5/2001 | Rothwein |
| 6,233,646 B1 | 5/2001 | Hahm |
| 6,289,358 B1 | 9/2001 | Mattis |
| 6,292,880 B1 | 9/2001 | Mattis |
| 6,332,158 B1 | 12/2001 | Risley |
| 6,363,067 B1 | 3/2002 | Chung |
| 6,366,947 B1 | 4/2002 | Kavner |
| 6,366,988 B1 | 4/2002 | Skiba |
| 6,574,377 B1 | 6/2003 | Cahill |
| 6,654,792 B1 | 11/2003 | Verma |
| 6,667,957 B1 | 12/2003 | Corson |
| 6,681,220 B1 | 1/2004 | Kaplan |
| 6,681,326 B2 | 1/2004 | Son |
| 6,732,273 B1 | 5/2004 | Byers |
| 6,769,066 B1 | 7/2004 | Botros |
| 6,772,333 B1 | 8/2004 | Brendel |
| 6,775,258 B1 | 8/2004 | vanValkenburg |
| 6,834,272 B1 | 12/2004 | Naor |
| 6,862,280 B1 | 3/2005 | Bertagna |
| 6,901,452 B1 | 5/2005 | Bertagna |
| 6,915,307 B1 | 7/2005 | Mattis |
| 6,917,985 B2 | 7/2005 | Madruga |
| 6,957,228 B1 | 10/2005 | Graser |
| 6,968,393 B1 | 11/2005 | Chen |
| 6,981,029 B1 | 12/2005 | Menditto |
| 7,007,024 B2 | 2/2006 | Zelenka |
| 7,013,389 B1 | 3/2006 | Srivastava |
| 7,031,308 B2 | 4/2006 | Garcia-Luna-Aceves |
| 7,043,637 B2 | 5/2006 | Bolosky |
| 7,061,877 B1 | 6/2006 | Gummalla |
| 7,080,073 B1 | 7/2006 | Jiang |
| RE39,360 E | 10/2006 | Aziz |
| 7,149,750 B2 | 12/2006 | Chadwick |
| 7,152,094 B1 | 12/2006 | Jannu |
| 7,177,646 B2 | 2/2007 | ONeill |
| 7,206,860 B2 | 4/2007 | Murakami |
| 7,206,861 B1 | 4/2007 | Callon |
| 7,210,326 B2 | 5/2007 | Kawamoto |
| 7,233,948 B1 | 6/2007 | Shamoon |
| 7,246,159 B2 | 7/2007 | Aggarwal |
| 7,257,837 B2 | 8/2007 | Xu |
| 7,287,275 B2 | 10/2007 | Moskowitz |
| 7,315,541 B1 | 1/2008 | Housel |
| 7,339,929 B2 | 3/2008 | Zelig |
| 7,350,229 B1 | 3/2008 | Lander |
| 7,362,727 B1 | 4/2008 | ONeill |
| 7,382,787 B1 | 6/2008 | Barnes |
| 7,395,507 B2 | 7/2008 | Robarts |
| 7,426,696 B1 | 9/2008 | Hwang |
| 7,430,755 B1 | 9/2008 | Hughes |
| 7,444,251 B2 | 10/2008 | Nikovski |
| 7,466,703 B1 | 12/2008 | Arunachalam |
| 7,472,422 B1 | 12/2008 | Agbabian |
| 7,496,668 B2 | 2/2009 | Hawkinson |
| 7,509,425 B1 | 3/2009 | Rosenberg |
| 7,523,016 B1 | 4/2009 | Surdulescu |
| 7,535,926 B1 | 5/2009 | Deshpande |
| 7,542,471 B2 | 6/2009 | Samuels |
| 7,543,064 B2 | 6/2009 | Juncker |
| 7,552,233 B2 | 6/2009 | Raju |
| 7,555,482 B2 | 6/2009 | Korkus |
| 7,555,563 B2 | 6/2009 | Ott |
| 7,564,812 B1 | 7/2009 | Elliott |
| 7,567,547 B2 | 7/2009 | Mosko |
| 7,567,946 B2 | 7/2009 | Andreoli |
| 7,580,971 B1 | 8/2009 | Gollapudi |
| 7,623,535 B2 | 11/2009 | Guichard |
| 7,636,767 B2 | 12/2009 | Lev-Ran |
| 7,647,507 B1 | 1/2010 | Feng |
| 7,660,324 B2 | 2/2010 | Oguchi |
| 7,685,290 B2 | 3/2010 | Satapati |
| 7,698,463 B2 | 4/2010 | Ogier |
| 7,698,559 B1 | 4/2010 | Chaudhury |
| 7,711,684 B2 | 5/2010 | Sundaresan |
| 7,747,749 B1 | 6/2010 | Aamodt |
| 7,769,887 B1 | 8/2010 | Bhattacharyya |
| 7,779,467 B2 | 8/2010 | Choi |
| 7,801,069 B2 | 9/2010 | Cheung |
| 7,801,177 B2 | 9/2010 | Luss |
| 7,814,425 B1 | 10/2010 | O'Shaugnessy |
| 7,816,441 B2 | 10/2010 | Elizalde |
| 7,831,733 B2 | 11/2010 | Sultan |
| 7,873,619 B1 | 1/2011 | Faibish |
| 7,908,337 B2 | 3/2011 | Garcia-Luna-Aceves |
| 7,924,837 B1 | 4/2011 | Shabtay |
| 7,953,014 B2 | 5/2011 | Toda |
| 7,953,885 B1 | 5/2011 | Devireddy |
| 7,979,912 B1 | 7/2011 | Roka |
| 8,000,267 B2 | 8/2011 | Solis |
| 8,010,691 B2 | 8/2011 | Kollmansberger |
| 8,069,023 B1 | 11/2011 | Frailong |
| 8,074,289 B1 | 12/2011 | Carpentier |
| 8,117,441 B2 | 2/2012 | Kurien |
| 8,160,069 B2 | 4/2012 | Jacobson |
| 8,204,060 B2 | 6/2012 | Jacobson |
| 8,214,364 B2 | 7/2012 | Bigus |
| 8,224,985 B2 | 7/2012 | Takeda |
| 8,225,057 B1 | 7/2012 | Zheng |
| 8,239,331 B2 | 8/2012 | Shanmugavelayutham |
| 8,271,578 B2 | 9/2012 | Sheffi |
| 8,271,687 B2 | 9/2012 | Turner |
| 8,312,064 B1 | 11/2012 | Gauvin |
| 8,332,357 B1 | 12/2012 | Chung |
| 8,375,420 B2 | 2/2013 | Farrell |
| 8,386,622 B2 | 2/2013 | Jacobson |
| 8,447,851 B1 | 5/2013 | Anderson |
| 8,462,781 B2 | 6/2013 | McGhee |
| 8,467,297 B2 | 6/2013 | Liu |
| 8,473,633 B2 | 6/2013 | Eardley |
| 8,553,562 B2 | 10/2013 | Allan |
| 8,572,214 B2 | 10/2013 | Garcia-Luna-Aceves |
| 8,654,649 B2 | 2/2014 | Vasseur |
| 8,665,757 B2 | 3/2014 | Kling |
| 8,667,172 B2 | 3/2014 | Ravindran |
| 8,677,451 B1 | 3/2014 | Bhimaraju |
| 8,688,619 B1 | 4/2014 | Ezick |
| 8,688,727 B1 | 4/2014 | Das |
| 8,699,350 B1 | 4/2014 | Kumar |
| 8,718,055 B2 | 5/2014 | Vasseur |
| 8,750,820 B2 | 6/2014 | Allan |
| 8,761,022 B2 | 6/2014 | Chiabaut |
| 8,762,477 B2 | 6/2014 | Xie |
| 8,762,570 B2 | 6/2014 | Qian |
| 8,762,707 B2 | 6/2014 | Killian |
| 8,767,627 B2 | 7/2014 | Ezure |
| 8,817,594 B2 | 8/2014 | Gero |
| 8,826,381 B2 | 9/2014 | Kim |

(56) References Cited

U.S. PATENT DOCUMENTS

| | | |
|---|---|---|
| 8,832,302 B1 | 9/2014 | Bradford |
| 8,836,536 B2 | 9/2014 | Marwah |
| 8,861,356 B2 | 10/2014 | Kozat |
| 8,862,774 B2 | 10/2014 | Vasseur |
| 8,863,227 B2 | 10/2014 | Zhang |
| 8,868,779 B2 | 10/2014 | ONeill |
| 8,874,842 B1 | 10/2014 | Kimmel |
| 8,880,682 B2 | 11/2014 | Bishop |
| 8,903,756 B2 | 12/2014 | Zhao |
| 8,923,293 B2 | 12/2014 | Jacobson |
| 8,934,496 B2 | 1/2015 | Vasseur |
| 8,937,865 B1 | 1/2015 | Kumar |
| 8,972,969 B2 | 3/2015 | Gaither |
| 8,977,596 B2 | 3/2015 | Montulli |
| 9,002,921 B2 | 4/2015 | Westphal |
| 9,009,465 B2 | 4/2015 | Zhang |
| 9,032,095 B1 | 5/2015 | Traina |
| 9,071,498 B2 | 6/2015 | Beser |
| 9,112,895 B1 | 8/2015 | Lin |
| 9,137,152 B2 | 9/2015 | Xie |
| 9,253,087 B2 | 2/2016 | Zhang |
| 9,270,598 B1 | 2/2016 | Oran |
| 9,280,610 B2 | 3/2016 | Gruber |
| 9,380,326 B1 | 6/2016 | Corley |
| 9,400,852 B2 | 7/2016 | Kim |
| 9,503,365 B2 * | 11/2016 | Mahadevan .......... H04L 45/566 |
| 9,729,616 B2 * | 8/2017 | Mahadevan ...... G06F 17/30598 |
| 9,729,662 B2 * | 8/2017 | Mahadevan ........ H04L 67/2842 |
| 2001/0051927 A1 | 12/2001 | London |
| 2002/0002680 A1 | 1/2002 | Carbajal |
| 2002/0010795 A1 | 1/2002 | Brown |
| 2002/0038296 A1 | 3/2002 | Margolus |
| 2002/0048269 A1 | 4/2002 | Hong |
| 2002/0054593 A1 | 5/2002 | Morohashi |
| 2002/0077988 A1 | 6/2002 | Sasaki |
| 2002/0078066 A1 | 6/2002 | Robinson |
| 2002/0138551 A1 | 9/2002 | Erickson |
| 2002/0152305 A1 | 10/2002 | Jackson |
| 2002/0176404 A1 | 11/2002 | Girard |
| 2002/0188605 A1 | 12/2002 | Adya |
| 2002/0199014 A1 | 12/2002 | Yang |
| 2003/0004621 A1 | 1/2003 | Bousquet |
| 2003/0009365 A1 | 1/2003 | Tynan |
| 2003/0033394 A1 | 2/2003 | Stine |
| 2003/0046396 A1 | 3/2003 | Richter |
| 2003/0046421 A1 | 3/2003 | Horvitz et al. |
| 2003/0046437 A1 | 3/2003 | Eytchison |
| 2003/0048793 A1 | 3/2003 | Pochon |
| 2003/0051100 A1 | 3/2003 | Patel |
| 2003/0061384 A1 | 3/2003 | Nakatani |
| 2003/0074472 A1 | 4/2003 | Lucco |
| 2003/0088696 A1 | 5/2003 | McCanne |
| 2003/0097447 A1 | 5/2003 | Johnston |
| 2003/0099237 A1 | 5/2003 | Mitra |
| 2003/0140257 A1 | 7/2003 | Peterka |
| 2003/0229892 A1 | 12/2003 | Sardera |
| 2004/0024879 A1 | 2/2004 | Dingman |
| 2004/0030602 A1 | 2/2004 | Rosenquist |
| 2004/0049541 A1 | 3/2004 | Swahn |
| 2004/0064737 A1 | 4/2004 | Milliken |
| 2004/0071140 A1 | 4/2004 | Jason |
| 2004/0073617 A1 | 4/2004 | Milliken |
| 2004/0073715 A1 | 4/2004 | Folkes |
| 2004/0139230 A1 | 7/2004 | Kim |
| 2004/0196783 A1 | 10/2004 | Shinomiya |
| 2004/0218548 A1 | 11/2004 | Kennedy |
| 2004/0221047 A1 | 11/2004 | Grover |
| 2004/0225627 A1 | 11/2004 | Botros |
| 2004/0233916 A1 | 11/2004 | Takeuchi |
| 2004/0246902 A1 | 12/2004 | Weinstein |
| 2004/0252683 A1 | 12/2004 | Kennedy |
| 2004/0267902 A1 | 12/2004 | Yang |
| 2005/0003832 A1 | 1/2005 | Osafune |
| 2005/0028156 A1 | 2/2005 | Hammond |
| 2005/0043060 A1 | 2/2005 | Brandenberg |
| 2005/0050211 A1 | 3/2005 | Kaul |
| 2005/0066121 A1 | 3/2005 | Keeler |
| 2005/0074001 A1 | 4/2005 | Mattes |
| 2005/0132207 A1 | 6/2005 | Mourad |
| 2005/0149508 A1 | 7/2005 | Deshpande |
| 2005/0159823 A1 | 7/2005 | Hayes |
| 2005/0198351 A1 | 9/2005 | Nog |
| 2005/0249196 A1 | 11/2005 | Ansari |
| 2005/0259637 A1 | 11/2005 | Chu |
| 2005/0262217 A1 | 11/2005 | Nonaka |
| 2005/0281288 A1 | 12/2005 | Banerjee |
| 2005/0286535 A1 | 12/2005 | Shrum |
| 2005/0289222 A1 | 12/2005 | Sahim |
| 2006/0010249 A1 | 1/2006 | Sabesan |
| 2006/0029102 A1 | 2/2006 | Abe |
| 2006/0039379 A1 | 2/2006 | Abe |
| 2006/0051055 A1 | 3/2006 | Ohkawa |
| 2006/0072523 A1 | 4/2006 | Richardson |
| 2006/0099973 A1 | 5/2006 | Nair |
| 2006/0129514 A1 | 6/2006 | Watanabe |
| 2006/0133343 A1 | 6/2006 | Huang |
| 2006/0146686 A1 | 7/2006 | Kim |
| 2006/0173831 A1 | 8/2006 | Basso |
| 2006/0193295 A1 | 8/2006 | White |
| 2006/0203804 A1 | 9/2006 | Whitmore |
| 2006/0206445 A1 | 9/2006 | Andreoli |
| 2006/0215684 A1 | 9/2006 | Capone |
| 2006/0223504 A1 | 10/2006 | Ishak |
| 2006/0242155 A1 | 10/2006 | Moore |
| 2006/0248078 A1 | 11/2006 | Gross |
| 2006/0256767 A1 | 11/2006 | Suzuki |
| 2006/0268792 A1 | 11/2006 | Belcea |
| 2006/0288237 A1 | 12/2006 | Goodwill |
| 2007/0019619 A1 | 1/2007 | Foster |
| 2007/0073888 A1 | 3/2007 | Madhok |
| 2007/0094265 A1 | 4/2007 | Korkus |
| 2007/0112880 A1 | 5/2007 | Yang |
| 2007/0124412 A1 | 5/2007 | Narayanaswami |
| 2007/0127457 A1 | 6/2007 | Mirtorabi |
| 2007/0156998 A1 | 7/2007 | Gorobets |
| 2007/0160062 A1 | 7/2007 | Morishita |
| 2007/0162394 A1 | 7/2007 | Zager |
| 2007/0171828 A1 | 7/2007 | Dalal |
| 2007/0189284 A1 | 8/2007 | Kecskemeti |
| 2007/0195765 A1 | 8/2007 | Heissenbuttel |
| 2007/0204011 A1 | 8/2007 | Shaver |
| 2007/0209067 A1 | 9/2007 | Fogel |
| 2007/0239892 A1 | 10/2007 | Ott |
| 2007/0240207 A1 | 10/2007 | Belakhdar |
| 2007/0245034 A1 | 10/2007 | Retana |
| 2007/0253418 A1 | 11/2007 | Shiri |
| 2007/0255677 A1 | 11/2007 | Alexander |
| 2007/0255699 A1 | 11/2007 | Sreenivas |
| 2007/0255781 A1 | 11/2007 | Li |
| 2007/0274504 A1 | 11/2007 | Maes |
| 2007/0275701 A1 | 11/2007 | Jonker |
| 2007/0276907 A1 | 11/2007 | Maes |
| 2007/0283158 A1 | 12/2007 | Danseglio |
| 2007/0294187 A1 | 12/2007 | Scherrer |
| 2008/0005056 A1 | 1/2008 | Stelzig |
| 2008/0005223 A1 | 1/2008 | Flake |
| 2008/0010366 A1 | 1/2008 | Duggan |
| 2008/0037420 A1 | 2/2008 | Tang |
| 2008/0043989 A1 | 2/2008 | Furutono |
| 2008/0046340 A1 | 2/2008 | Brown |
| 2008/0059631 A1 | 3/2008 | Bergstrom |
| 2008/0080440 A1 | 4/2008 | Yarvis |
| 2008/0082509 A1 | 4/2008 | Bessieres |
| 2008/0082662 A1 | 4/2008 | Dandliker |
| 2008/0095159 A1 | 4/2008 | Suzuki |
| 2008/0101357 A1 | 5/2008 | Iovanna |
| 2008/0107034 A1 | 5/2008 | Jetcheva |
| 2008/0107259 A1 | 5/2008 | Satou |
| 2008/0123536 A1 | 5/2008 | Johnson |
| 2008/0123862 A1 | 5/2008 | Rowley |
| 2008/0133583 A1 | 6/2008 | Artan |
| 2008/0133755 A1 | 6/2008 | Pollack |
| 2008/0151755 A1 | 6/2008 | Nishioka |
| 2008/0159271 A1 | 7/2008 | Kutt |

(56) References Cited

U.S. PATENT DOCUMENTS

| | | |
|---|---|---|
| 2008/0165775 A1 | 7/2008 | Das |
| 2008/0186901 A1 | 8/2008 | Itagaki |
| 2008/0200153 A1 | 8/2008 | Fitzpatrick |
| 2008/0215669 A1 | 9/2008 | Gaddy |
| 2008/0216086 A1 | 9/2008 | Tanaka |
| 2008/0243992 A1 | 10/2008 | Jardetzky |
| 2008/0244460 A1 | 10/2008 | Louch |
| 2008/0250006 A1 | 10/2008 | Dettinger |
| 2008/0256138 A1 | 10/2008 | Sim-Tang |
| 2008/0256359 A1 | 10/2008 | Kahn |
| 2008/0270618 A1 | 10/2008 | Rosenberg |
| 2008/0271143 A1 | 10/2008 | Stephens |
| 2008/0287142 A1 | 11/2008 | Keighran |
| 2008/0288580 A1 | 11/2008 | Wang |
| 2008/0291923 A1 | 11/2008 | Back |
| 2008/0298376 A1 | 12/2008 | Takeda |
| 2008/0320148 A1 | 12/2008 | Capuozzo |
| 2009/0006659 A1 | 1/2009 | Collins |
| 2009/0013324 A1 | 1/2009 | Gobara |
| 2009/0022154 A1 | 1/2009 | Kiribe |
| 2009/0024641 A1 | 1/2009 | Quigley |
| 2009/0030978 A1 | 1/2009 | Johnson |
| 2009/0037763 A1 | 2/2009 | Adhya |
| 2009/0052660 A1 | 2/2009 | Chen |
| 2009/0067429 A1 | 3/2009 | Nagai |
| 2009/0077184 A1 | 3/2009 | Brewer |
| 2009/0092043 A1 | 4/2009 | Lapuh |
| 2009/0097631 A1 | 4/2009 | Gisby |
| 2009/0103515 A1 | 4/2009 | Pointer |
| 2009/0113068 A1 | 4/2009 | Fujihira |
| 2009/0116393 A1 | 5/2009 | Hughes |
| 2009/0117922 A1 | 5/2009 | Bell |
| 2009/0132662 A1 | 5/2009 | Sheridan |
| 2009/0135728 A1 | 5/2009 | Shen |
| 2009/0144300 A1 | 6/2009 | Chatley |
| 2009/0157887 A1 | 6/2009 | Froment |
| 2009/0185745 A1 | 7/2009 | Momosaki |
| 2009/0193101 A1 | 7/2009 | Munetsugu |
| 2009/0198832 A1 | 8/2009 | Shah |
| 2009/0222344 A1 | 9/2009 | Greene |
| 2009/0228593 A1 | 9/2009 | Takeda |
| 2009/0254572 A1 | 10/2009 | Redlich |
| 2009/0268905 A1 | 10/2009 | Matsushima |
| 2009/0274158 A1 | 11/2009 | Sharp |
| 2009/0276396 A1 | 11/2009 | Gorman |
| 2009/0285209 A1 | 11/2009 | Stewart |
| 2009/0287835 A1 | 11/2009 | Jacobson |
| 2009/0287853 A1 | 11/2009 | Carson |
| 2009/0288076 A1 | 11/2009 | Johnson |
| 2009/0288143 A1 | 11/2009 | Stebila |
| 2009/0288163 A1 | 11/2009 | Jacobson |
| 2009/0292743 A1 | 11/2009 | Bigus |
| 2009/0293121 A1 | 11/2009 | Bigus |
| 2009/0296719 A1 | 12/2009 | Maier |
| 2009/0300079 A1 | 12/2009 | Shitomi |
| 2009/0300407 A1 | 12/2009 | Kamath |
| 2009/0300512 A1 | 12/2009 | Ahn |
| 2009/0307286 A1 | 12/2009 | Laffin |
| 2009/0307333 A1 | 12/2009 | Welingkar |
| 2009/0323632 A1 | 12/2009 | Nix |
| 2010/0005061 A1 | 1/2010 | Basco |
| 2010/0027539 A1 | 2/2010 | Beverly |
| 2010/0046546 A1 | 2/2010 | Ram |
| 2010/0057929 A1 | 3/2010 | Merat |
| 2010/0058346 A1 | 3/2010 | Narang |
| 2010/0088370 A1 | 4/2010 | Wu |
| 2010/0094767 A1 | 4/2010 | Miltonberger |
| 2010/0094876 A1 | 4/2010 | Huang |
| 2010/0098093 A1 | 4/2010 | Ejzak |
| 2010/0100465 A1 | 4/2010 | Cooke |
| 2010/0103870 A1 | 4/2010 | Garcia-Luna-Aceves |
| 2010/0124191 A1 | 5/2010 | Vos |
| 2010/0125911 A1 | 5/2010 | Bhaskaran |
| 2010/0131660 A1 | 5/2010 | Dec |
| 2010/0150155 A1 | 6/2010 | Napierala |
| 2010/0165976 A1 | 7/2010 | Khan |
| 2010/0169478 A1 | 7/2010 | Saha |
| 2010/0169503 A1 | 7/2010 | Kollmansberger |
| 2010/0180332 A1 | 7/2010 | Ben-Yochanan |
| 2010/0182995 A1 | 7/2010 | Hwang |
| 2010/0185753 A1 | 7/2010 | Liu |
| 2010/0195653 A1 | 8/2010 | Jacobson |
| 2010/0195654 A1 | 8/2010 | Jacobson |
| 2010/0195655 A1 | 8/2010 | Jacobson |
| 2010/0217874 A1 | 8/2010 | Anantharaman |
| 2010/0217985 A1 | 8/2010 | Fahrny |
| 2010/0232402 A1 | 9/2010 | Przybysz |
| 2010/0232439 A1 | 9/2010 | Dham |
| 2010/0235516 A1 | 9/2010 | Nakamura |
| 2010/0246549 A1 | 9/2010 | Zhang |
| 2010/0250497 A1 | 9/2010 | Redlich |
| 2010/0250939 A1 | 9/2010 | Adams |
| 2010/0257149 A1 | 10/2010 | Cognigni |
| 2010/0268782 A1 | 10/2010 | Zombek |
| 2010/0272107 A1 | 10/2010 | Papp |
| 2010/0281263 A1 | 11/2010 | Ugawa |
| 2010/0284309 A1 | 11/2010 | Allan |
| 2010/0284404 A1 | 11/2010 | Gopinath |
| 2010/0293293 A1 | 11/2010 | Beser |
| 2010/0316052 A1 | 12/2010 | Petersen |
| 2010/0322249 A1 | 12/2010 | Thathapudi |
| 2010/0332595 A1 | 12/2010 | Fullagar |
| 2011/0013637 A1 | 1/2011 | Xue |
| 2011/0019674 A1 | 1/2011 | Iovanna |
| 2011/0022812 A1 | 1/2011 | vanderLinden |
| 2011/0029952 A1 | 2/2011 | Harrington |
| 2011/0055392 A1 | 3/2011 | Shen |
| 2011/0055921 A1 | 3/2011 | Narayanaswamy |
| 2011/0060716 A1 | 3/2011 | Forman |
| 2011/0060717 A1 | 3/2011 | Forman |
| 2011/0090908 A1 | 4/2011 | Jacobson |
| 2011/0106755 A1 | 5/2011 | Hao |
| 2011/0131308 A1 | 6/2011 | Eriksson |
| 2011/0137919 A1 | 6/2011 | Ryu |
| 2011/0145597 A1 | 6/2011 | Yamaguchi |
| 2011/0145858 A1 | 6/2011 | Philpott |
| 2011/0149858 A1 | 6/2011 | Hwang |
| 2011/0153840 A1 | 6/2011 | Narayana |
| 2011/0158122 A1 | 6/2011 | Murphy |
| 2011/0161408 A1 | 6/2011 | Kim |
| 2011/0202609 A1 | 8/2011 | Chaturvedi |
| 2011/0219093 A1 | 9/2011 | Ragunathan |
| 2011/0219427 A1 | 9/2011 | Hito |
| 2011/0219727 A1 | 9/2011 | May |
| 2011/0225293 A1 | 9/2011 | Rathod |
| 2011/0231578 A1 | 9/2011 | Nagappan |
| 2011/0239256 A1 | 9/2011 | Gholmieh |
| 2011/0258049 A1 | 10/2011 | Ramer |
| 2011/0264824 A1 | 10/2011 | Venkata Subramanian |
| 2011/0265159 A1 | 10/2011 | Ronda |
| 2011/0265174 A1 | 10/2011 | Thornton |
| 2011/0271007 A1 | 11/2011 | Wang |
| 2011/0280214 A1 | 11/2011 | Lee |
| 2011/0286457 A1 | 11/2011 | Ee |
| 2011/0286459 A1 | 11/2011 | Rembarz |
| 2011/0295783 A1 | 12/2011 | Zhao |
| 2011/0299454 A1 | 12/2011 | Krishnaswamy |
| 2012/0011170 A1 | 1/2012 | Elad |
| 2012/0011551 A1 | 1/2012 | Levy |
| 2012/0023113 A1 | 1/2012 | Ferren |
| 2012/0036180 A1 | 2/2012 | Thornton |
| 2012/0045064 A1 | 2/2012 | Rembarz |
| 2012/0047361 A1 | 2/2012 | Erdmann |
| 2012/0066727 A1 | 3/2012 | Nozoe |
| 2012/0079056 A1 | 3/2012 | Turanyi et al. |
| 2012/0102136 A1 | 4/2012 | Srebrny |
| 2012/0106339 A1 | 5/2012 | Mishra |
| 2012/0110159 A1 | 5/2012 | Richardson |
| 2012/0114313 A1 | 5/2012 | Phillips |
| 2012/0120803 A1 | 5/2012 | Farkas |
| 2012/0127994 A1 | 5/2012 | Ko |
| 2012/0136676 A1 | 5/2012 | Goodall |
| 2012/0136936 A1 | 5/2012 | Quintuna |
| 2012/0136945 A1 | 5/2012 | Lee |

(56) References Cited

U.S. PATENT DOCUMENTS

| | | |
|---|---|---|
| 2012/0137367 A1 | 5/2012 | Dupont |
| 2012/0141093 A1 | 6/2012 | Yamaguchi |
| 2012/0155464 A1 | 6/2012 | Kim |
| 2012/0158912 A1 | 6/2012 | Jacobson |
| 2012/0158973 A1 | 6/2012 | Jacobson |
| 2012/0163373 A1 | 6/2012 | Lo |
| 2012/0166433 A1 | 6/2012 | Tseng |
| 2012/0166806 A1 | 6/2012 | Zhang |
| 2012/0170913 A1 | 7/2012 | Isozaki |
| 2012/0179653 A1 | 7/2012 | Araki |
| 2012/0197690 A1 | 8/2012 | Agulnek |
| 2012/0198048 A1 | 8/2012 | Ioffe |
| 2012/0221150 A1 | 8/2012 | Arensmeier |
| 2012/0224487 A1 | 9/2012 | Hui |
| 2012/0226902 A1 | 9/2012 | Kim |
| 2012/0237028 A1 | 9/2012 | Khazan |
| 2012/0257500 A1 | 10/2012 | Lynch |
| 2012/0284791 A1 | 11/2012 | Miller |
| 2012/0290669 A1 | 11/2012 | Parks |
| 2012/0290919 A1 | 11/2012 | Melnyk |
| 2012/0291102 A1 | 11/2012 | Cohen |
| 2012/0300669 A1 | 11/2012 | Zahavi |
| 2012/0307629 A1 | 12/2012 | Vasseur |
| 2012/0314580 A1 | 12/2012 | Hong |
| 2012/0317307 A1 | 12/2012 | Ravindran |
| 2012/0317655 A1 | 12/2012 | Zhang |
| 2012/0322422 A1 | 12/2012 | Frecks |
| 2012/0323933 A1 | 12/2012 | He |
| 2012/0331112 A1 | 12/2012 | Chatani |
| 2013/0016695 A1 | 1/2013 | Ravindran |
| 2013/0024560 A1 | 1/2013 | Vasseur |
| 2013/0039249 A1 | 2/2013 | Ravindran |
| 2013/0041982 A1 | 2/2013 | Shi |
| 2013/0051392 A1 | 2/2013 | Filsfils |
| 2013/0054971 A1 | 2/2013 | Yamaguchi |
| 2013/0060962 A1 | 3/2013 | Wang |
| 2013/0061084 A1 | 3/2013 | Barton |
| 2013/0066823 A1 | 3/2013 | Sweeney |
| 2013/0073552 A1 | 3/2013 | Rangwala |
| 2013/0073882 A1 | 3/2013 | Inbaraj |
| 2013/0074155 A1 | 3/2013 | Huh |
| 2013/0090942 A1 | 4/2013 | Robinson |
| 2013/0091237 A1 | 4/2013 | Ambalavanar |
| 2013/0091539 A1 | 4/2013 | Khurana |
| 2013/0110781 A1 | 5/2013 | Golab |
| 2013/0110987 A1 | 5/2013 | Kim |
| 2013/0111063 A1 | 5/2013 | Lee |
| 2013/0121489 A1 | 5/2013 | Pestoni |
| 2013/0128786 A1 | 5/2013 | Sultan |
| 2013/0132719 A1 | 5/2013 | Kobayashi |
| 2013/0139245 A1 | 5/2013 | Thomas |
| 2013/0151584 A1 | 6/2013 | Westphal |
| 2013/0151646 A1 | 6/2013 | Chidambaram |
| 2013/0152070 A1 | 6/2013 | Bhullar |
| 2013/0163426 A1 | 6/2013 | Beliveau |
| 2013/0163758 A1 | 6/2013 | Viswanathan |
| 2013/0166668 A1 | 6/2013 | Byun |
| 2013/0173822 A1 | 7/2013 | Hong |
| 2013/0182568 A1 | 7/2013 | Lee |
| 2013/0182931 A1 | 7/2013 | Fan |
| 2013/0185406 A1 | 7/2013 | Choi |
| 2013/0191412 A1 | 7/2013 | Kitamura |
| 2013/0197698 A1 | 8/2013 | Shah |
| 2013/0198119 A1 | 8/2013 | Eberhardt, III |
| 2013/0212185 A1 | 8/2013 | Pasquero |
| 2013/0219038 A1 | 8/2013 | Lee |
| 2013/0219081 A1 | 8/2013 | Qian |
| 2013/0219478 A1 | 8/2013 | Mahamuni |
| 2013/0223237 A1 | 8/2013 | Hui |
| 2013/0227048 A1 | 8/2013 | Xie |
| 2013/0227114 A1 | 8/2013 | Vasseur |
| 2013/0227166 A1 | 8/2013 | Ravindran |
| 2013/0242996 A1 | 9/2013 | Varvello |
| 2013/0250809 A1 | 9/2013 | Hui |
| 2013/0258878 A1 | 10/2013 | Wakikawa |
| 2013/0262365 A1 | 10/2013 | Dolbear |
| 2013/0262698 A1 | 10/2013 | Schwan |
| 2013/0275544 A1 | 10/2013 | Westphal |
| 2013/0282854 A1 | 10/2013 | Jang |
| 2013/0282860 A1 | 10/2013 | Zhang |
| 2013/0282920 A1 | 10/2013 | Zhang |
| 2013/0304758 A1 | 11/2013 | Gruber |
| 2013/0304937 A1 | 11/2013 | Lee |
| 2013/0325888 A1 | 12/2013 | Oneppo |
| 2013/0329696 A1 | 12/2013 | Xu |
| 2013/0332955 A1 | 12/2013 | Hong |
| 2013/0332971 A1 | 12/2013 | Fisher |
| 2013/0336103 A1 | 12/2013 | Vasseur |
| 2013/0336323 A1 | 12/2013 | Srinivasan |
| 2013/0339481 A1 | 12/2013 | Hong |
| 2013/0343408 A1 | 12/2013 | Cook |
| 2013/0346877 A1 | 12/2013 | Borovoy |
| 2014/0003232 A1 | 1/2014 | Guichard |
| 2014/0003424 A1 | 1/2014 | Matsuhira |
| 2014/0006354 A1 | 1/2014 | Parkison |
| 2014/0006565 A1 | 1/2014 | Muscariello |
| 2014/0023076 A1 | 1/2014 | Calo |
| 2014/0029445 A1 | 1/2014 | Hui |
| 2014/0032714 A1 | 1/2014 | Liu |
| 2014/0033193 A1 | 1/2014 | Palaniappan |
| 2014/0040505 A1 | 2/2014 | Barton |
| 2014/0040628 A1 | 2/2014 | Fort |
| 2014/0043987 A1 | 2/2014 | Watve |
| 2014/0047513 A1 | 2/2014 | vantNoordende |
| 2014/0074730 A1 | 3/2014 | Arensmeier |
| 2014/0075567 A1 | 3/2014 | Raleigh |
| 2014/0082135 A1 | 3/2014 | Jung |
| 2014/0082661 A1 | 3/2014 | Krahnstoever |
| 2014/0089454 A1 | 3/2014 | Jeon |
| 2014/0090761 A1 | 4/2014 | Foucher |
| 2014/0096249 A1 | 4/2014 | Dupont |
| 2014/0096269 A1 | 4/2014 | Amidei |
| 2014/0098685 A1 | 4/2014 | Shattil |
| 2014/0108313 A1 | 4/2014 | Heidasch |
| 2014/0108474 A1 | 4/2014 | David |
| 2014/0115037 A1 | 4/2014 | Liu |
| 2014/0122587 A1 | 5/2014 | Petker et al. |
| 2014/0129690 A1 | 5/2014 | Jaisinghani |
| 2014/0129736 A1 | 5/2014 | Yu |
| 2014/0136814 A1 | 5/2014 | Stark |
| 2014/0140348 A1 | 5/2014 | Perlman |
| 2014/0143370 A1 | 5/2014 | Vilenski |
| 2014/0146819 A1 | 5/2014 | Bae |
| 2014/0149733 A1 | 5/2014 | Kim |
| 2014/0237095 A1 | 5/2014 | Petker |
| 2014/0156396 A1 | 6/2014 | deKozan |
| 2014/0165207 A1 | 6/2014 | Engel |
| 2014/0172783 A1 | 6/2014 | Suzuki |
| 2014/0172981 A1 | 6/2014 | Kim |
| 2014/0173034 A1 | 6/2014 | Liu |
| 2014/0173076 A1 | 6/2014 | Ravindran |
| 2014/0181140 A1 | 6/2014 | Kim |
| 2014/0192677 A1 | 7/2014 | Chew |
| 2014/0192717 A1 | 7/2014 | Liu |
| 2014/0195328 A1 | 7/2014 | Ferens |
| 2014/0195641 A1 | 7/2014 | Wang |
| 2014/0195666 A1 | 7/2014 | Dumitriu |
| 2014/0204945 A1 | 7/2014 | Byun |
| 2014/0214942 A1 | 7/2014 | Ozonat |
| 2014/0233575 A1 | 8/2014 | Xie |
| 2014/0237085 A1 | 8/2014 | Park |
| 2014/0245359 A1 | 8/2014 | DeFoy |
| 2014/0254595 A1 | 9/2014 | Luo |
| 2014/0280823 A1 | 9/2014 | Varvello |
| 2014/0281489 A1 | 9/2014 | Peterka |
| 2014/0281505 A1 | 9/2014 | Zhang |
| 2014/0282816 A1 | 9/2014 | Xie |
| 2014/0289325 A1 | 9/2014 | Solis |
| 2014/0289790 A1 | 9/2014 | Wilson |
| 2014/0298248 A1 | 10/2014 | Kang |
| 2014/0314093 A1 | 10/2014 | You |
| 2014/0337276 A1 | 11/2014 | Iordanov |
| 2014/0365550 A1 | 12/2014 | Jang |
| 2015/0006896 A1 | 1/2015 | Franck |

(56) References Cited

U.S. PATENT DOCUMENTS

| | | |
|---|---|---|
| 2015/0018770 A1 | 1/2015 | Baran |
| 2015/0032892 A1 | 1/2015 | Narayanan |
| 2015/0033365 A1 | 1/2015 | Mellor |
| 2015/0036535 A1 | 2/2015 | Mosko |
| 2015/0039890 A1 | 2/2015 | Khosravi |
| 2015/0063802 A1 | 3/2015 | Bahadur |
| 2015/0089081 A1 | 3/2015 | Thubert |
| 2015/0095481 A1 | 4/2015 | Ohnishi |
| 2015/0095514 A1 | 4/2015 | Yu |
| 2015/0117253 A1 | 4/2015 | Scott |
| 2015/0120663 A1 | 4/2015 | LeScouarnec |
| 2015/0169758 A1 | 6/2015 | Assom |
| 2015/0188770 A1 | 7/2015 | Naiksatam |
| 2015/0195149 A1 | 7/2015 | Vasseur |
| 2015/0207633 A1 | 7/2015 | Ravindran |
| 2015/0207864 A1 | 7/2015 | Wilson |
| 2015/0222424 A1 | 8/2015 | Mosko |
| 2015/0270957 A1 | 9/2015 | Uzun |
| 2015/0279348 A1 | 10/2015 | Cao |
| 2015/0281071 A1 | 10/2015 | Mosko |
| 2015/0288755 A1 | 10/2015 | Mosko |
| 2015/0312300 A1 | 10/2015 | Mosko |
| 2015/0349961 A1 | 12/2015 | Mosko |
| 2015/0372903 A1 | 12/2015 | Hui |
| 2015/0381546 A1 | 12/2015 | Mahadevan |
| 2016/0014027 A1 | 1/2016 | Oran |
| 2016/0019275 A1 | 1/2016 | Mosko |
| 2016/0021172 A1* | 1/2016 | Mahadevan ...... G06F 17/30598 709/204 |
| 2016/0044126 A1* | 2/2016 | Mahadevan ........ H04L 67/2842 709/213 |
| 2016/0062840 A1 | 3/2016 | Scott |
| 2016/0110466 A1 | 4/2016 | Uzun |
| 2016/0149913 A1 | 5/2016 | Eriksson |
| 2016/0171184 A1 | 6/2016 | Solis |
| 2016/0173604 A1 | 6/2016 | Panigrahi |
| 2016/0205178 A1* | 7/2016 | Mosko .................. H04L 67/104 709/204 |

FOREIGN PATENT DOCUMENTS

| | | |
|---|---|---|
| DE | 19620817 A1 | 11/1997 |
| EP | 0295727 A2 | 12/1988 |
| EP | 0757065 A2 | 7/1996 |
| EP | 1077422 A2 | 2/2001 |
| EP | 1383265 A1 | 1/2004 |
| EP | 1384729 A1 | 1/2004 |
| EP | 1473889 A2 | 11/2004 |
| EP | 2120402 | 11/2009 |
| EP | 2120419 | 11/2009 |
| EP | 2120419 A2 | 11/2009 |
| EP | 2124415 A2 | 11/2009 |
| EP | 2214357 A1 | 8/2010 |
| EP | 2299754 A1 | 3/2011 |
| EP | 2323346 | 5/2011 |
| EP | 2552083 | 1/2013 |
| EP | 2562978 | 10/2014 |
| EP | 2978174 A1 | 1/2016 |
| EP | 2214356 | 5/2016 |
| WO | 03005288 A2 | 1/2003 |
| WO | 03042254 A1 | 5/2003 |
| WO | 03049369 A2 | 6/2003 |
| WO | 03091297 A1 | 11/2003 |
| WO | 2005041527 | 5/2005 |
| WO | 2007113180 A1 | 10/2007 |
| WO | 2007122620 | 11/2007 |
| WO | 2007144388 A1 | 12/2007 |
| WO | 2011049890 A1 | 4/2011 |
| WO | 2011159715 | 12/2011 |
| WO | 2012077073 A1 | 6/2012 |
| WO | 2013123410 | 8/2013 |
| WO | 2014023072 | 2/2014 |
| WO | 2014090761 | 6/2014 |
| WO | 2014102371 | 7/2014 |
| WO | 2015084327 | 6/2015 |

OTHER PUBLICATIONS

Akash Baid et al: "Comparing alternative approaches for networking of named objects in the future Internet", Computer Communications Workshops (Infocom Wkshps), 2012 IEEE Conference on, IEEE, Mar. 25, 2012, pp. 298-303, Paragraph [002] figure 1.

Priya Mahadevan: "CCNx 1.0 Tutorial", Mar. 16, 2014, pp. 1-11, Retrieved from the Internet: http://www.ccnx.org/pubs/hhg/1.2 %20CCNx%201.0%20Tutorial.pdf [retrieved on Jun. 8, 2016] paragraphs [003]—[006], [0011], [0013] figures 1,2.

Marc Mosko et al "All-in-One Streams for Content Centric Networks", May 24, 2015, retrieved from the Internet: http://www.ccnx.org/pubs/AllinOne.pdf [downloaded Jun. 9, 2016] the whole document.

Cesar Ghali et al. "Elements of Trust in Named-Data Networking", Feb. 13, 2014 Retrieved from the internet Jun. 17, 2016 http://arxiv.org/pdf/1402.3332v5.pdf p. 5, col. 1 p. 2, col. 1-2 Section 4.1; p. 4, col. 2 Section 4.2; p. 4, col. 2.

Priya Mahadevan et al. "CCN-KRS", Proceedings of the 1st International Conference on Information-Centric Networking, Inc. '14, Sep. 24, 2014.

Flavio Roberto Santos et al. "Funnel: Choking Polluters in BitTorrent File Sharing Communities", IEEE Transactions on Network and Service Management, IEEE vol. 8, No. 4, Dec. 1, 2011.

Liu Wai-Xi et al: "Multisource Dissemination in content-centric networking", 2013 Fourth International conference on the network of the future (NOF), IEEE, Oct. 23, 2013, pp. 1-5.

Marie-Jose Montpetit et al.: "Network coding meets information-centric networking", Proceedings of the 1st ACM workshop on emerging Name-Oriented mobile networking design, architecture, algorithms, and applications, NOM '12, Jun. 11, 2012, pp. 31-36.

Asokan et al.: "Server-Supported Signatures", Computer Security Esorics 96, Sep. 25, 1996, pp. 131-143, Section 3.

Mandl et al.: "A Fast FPGA Based Coprocessor Supporting Hard Real-Time Search", New Frontiers of Information Technology, Proceedings of the 23rd Euromicro Conference Budapest, Sep. 1, 1997, pp. 499-506 The Whole Document.

Sun et al.: "Content-Based Route Lookup Using CAMs", Global Communications Conference, IEEE, Dec. 3, 2012 The Whole Document.

Gelenbe et al.: "Networks With Cognitive Packets", Modeling, Analysis and Simulation of Computer and Telecommunication Systems, 2000. IEEE, Aug. 29, 2000, pp. 3-10.

Vangelis et al.: "On the Role of Semantic Descriptions for Adaptable Protocol Stacks in the Internet of Things", 2014 28th International Conference on Advanced Information Networking and Applications Workshops, IEEE, May 13, 2014, pp. 437-443, last paragraph of section II.B.

Smetters et al. "Securing Network Content" Technical Report, PARC TR-2009-1, Oct. 1 2009, Retrieved from the internet URL:http//www.parc.com/content/attachments/TR-2009-01.pdf [retrieved Nov. 1, 2016].

Marc Mosko "CCNx Label Forwarding (CCNLF)" Jul. 21, 2014.

Gallo Alcatel-Lucent Bell Labs "Content-Centric Networking Packet Header Format" Jan. 26, 2015.

Huard J-F et al. "A Programmable Transport Architecture with QOS Guarantees" IEEE Communications Magazine, vol. 36, No. 10, Oct. 1, 1998.

Microsoft Computer Dictionary, Fifth Edition, 2002, Microsoft Press, p. 23.

Mind—A Brief Introduction, John R. Searle, 2004, Oxford University Press, pp. 62-67.

J.J. Garcia-Luna-Aceves "Name-Based Content Routing in Information Centric Networks Using Distance Information", Proceedings of the 1st International Conference on Information-Centric Networking, Inc '14, Sep. 24, 2014, pp. 7-16, p. 10, left-hand column, first paragraph.

(56) References Cited

OTHER PUBLICATIONS

Lan Wang et al.: "OSPFN: An OSPF Based Routing Protocol for Named Data Networking", Jul. 25, 2012, URL: http://new.named-data.net/wp-content/uploads/TROSPFN.pdf [Retreived on Jul. 25, 2012], section 3.1; p. 4.
Jacobson, Van et al., "Content-Centric Networking, Whitepaper Describing Future Assurable Global Networks", Palo Alto Research Center, Inc., Jan. 30, 2007, pp. 1-9.
Koponen, Teemu et al., "A Data-Oriented (and Beyond) Network Architecture", SIGCOMM '07, Aug. 27-31, 2007, Kyoto, Japan, XP-002579021, p. 181-192.
Mahadevan, Priya, et al. "Orbis: rescaling degree correlations to generate annotated internet topologies." ACM SIGCOMM Computer Communication Review. vol. 37. No. 4. ACM, 2007.
Mahadevan, Priya, et al. "Systematic topology analysis and generation using degree correlations." ACM SIGCOMM Computer Communication Review. vol. 36. No. 4. ACM, 2006.
Beben et al., "Content Aware Network based on Virtual Infrastructure", 2012 13th ACIS International Conference on Software Engineering.
Biradar et al., "Review of multicast routing mechanisms in mobile ad hoc networks", Aug. 16, Journal of Network and Computer Applications 35 (2012) 221-229.
Detti et al., "Supporting the Web with an information centric network that routes by name", Aug. 2012, Computer Networks 56, pp. 3705-3702.
Garcia-Luna-Aceves et al., "Automatic Routing Using Multiple Prefix Labels", 2012, IEEE, Ad Hoc and Sensor Networking Symposium.
Ishiyama, "On the Effectiveness of Diffusive Content Caching in Content-Centric Networking", Nov. 5, 2012, IEEE, Information and Telecommunication Technologies (APSITT), 2012 9th Asia-Pacific Symposium.
L. Wang et al., 'OSPFN: An OSPF Based Routing Protocol for Named Data Networking,' Technical Report NDN-0003, 2012.
Merindol et al., "An efficient algorithm to enable path diversity in link state routing networks", Jan. 10, Computer Networks 55 (2011), pp. 1132-1140.
Soh et al., "Efficient Prefix Updates for IP Router Using Lexicographic Ordering and Updateable Address Set", Jan. 2008, IEEE Transactions on Computers, vol. 57, No. 1.
V. Jacobson et al., 'Networking Named Content,' Proc. IEEE CoNEXT '09, Dec. 2009.
Ao-Jan Su, David R. Choffnes, Aleksandar Kuzmanovic, and Fabian E. Bustamante. Drafting Behind Akamai: Inferring Network Conditions Based on CDN Redirections. IEEE/ACM Transactions on Networking {Feb. 2009).
"PBC Library-Pairing-Based Cryptography-About," http://crypto.stanford.edu/pbc.downloaded Apr. 27, 2015.
C. Gentry and A. Silverberg. Hierarchical ID-Based Cryptography. Advances in Cryptology—ASIACRYPT 2002. Springer Berlin Heidelberg (2002).
Boneh et al., "Collusion Resistant Broadcast Encryption With Short Ciphertexts and Private Keys", 2005.
Hoque et al., "NLSR: Named-data Link State Routing Protocol", Aug. 12, 2013, ICN'13.
D. Boneh and M. Franklin. Identity-Based Encryption from the Weil Pairing. Advances in Cryptology—CRYPTO 2001, vol. 2139, Springer Berlin Heidelberg (2001).
Anteniese et al., "Improved Proxy Re-Encryption Schemes with Applications to Secure Distributed Storage", 2006.
Xiong et al., "CloudSeal: End-to-End Content Protection in Cloud-based Storage and Delivery Services", 2012.
J. Bethencourt, A, Sahai, and B. Waters, 'Ciphertext-policy attribute-based encryption,' in Proc. IEEE Security & Privacy 2007, Berkeley, CA, USA, May 2007, pp. 321-334.
J. Lotspiech, S. Nusser, and F. Pestoni. Anonymous Trust: Digit.
J. Shao and Z. Cao. CCA-Secure Proxy Re-Encryption without Pairings. Public Key Cryptography. Springer Lecture Notes in Computer Sciencevol. 5443 (2009).

Gopal et al. "Integrating content-based Mechanisms with hierarchical File systems", Feb. 1999, University of Arizona, 15 pages.
R. H. Deng, J. Weng, S. Liu, and K. Chen. Chosen-Ciphertext Secure Proxy Re-Encryption without Pairings. CANS. Spring Lecture Notes in Computer Science vol. 5339 (2008).
RTMP (2009). Available online at http://wwwimages.adobe.com/www.adobe.com/content/dam/Adobe/en/devnet/rtmp/ pdf/rtmp specification 1.0.pdf.
S. Chow, J. Weng, Y. Yang, and R. Deng. Efficient Unidirectional Proxy Re-Encryption. Progress in Cryptology—AFRICACRYPT 2010. Springer Berlin Heidelberg (2010).
S. Kamara and K. Lauter. Cryptographic Cloud Storage. Financial Cryptography and Data Security. Springer Berlin Heidelberg (2010).
Sandvine, Global Internet Phenomena Report—Spring 2012. Located online at http://www.sandvine.com/downloads/ documents/Phenomenal H 2012/Sandvine Global Internet Phenomena Report 1H 2012.pdf.
The Despotify Project (2012). Available online at http://despotify.sourceforge.net/.
V. K. Adhikari, S. Jain, Y. Chen, and Z.-L. Zhang. Vivisecting Youtube:An Active Measurement Study. In INFOCOM12 Miniconference (2012).
Vijay Kumar Adhikari, Yang Guo, Fang Hao, Matteo Varvello, Volker Hilt, Moritz Steiner, and Zhi-Li Zhang. Unreeling Netflix: Understanding and Improving Multi-CDN Movie Delivery. In the Proceedings of IEEE INFOCOM 2012 (2012).
Jacobson, Van et al. 'VoCCN: Voice Over Content-Centric Networks.' Dec. 1, 2009. ACM ReArch'09.
Rosenberg, J. "Interactive Connectivity Establishment (ICE): A Protocol for Network Address Translator (NAT) Traversal for Offer/Answer Protocols", Apr. 2010, pp. 1-117.
Shih, Eugene et al., 'Wake on Wireless: An Event Driven Energy Saving Strategy for Battery Operated Devices', Sep. 23, 2002, pp. 160-171.
Fall, K. et al., "DTN: an architectural retrospective", Selected areas in communications, IEEE Journal on, vol. 28, No. 5, Jun. 1, 2008, pp. 828-835.
Gritter, M. et al., 'An Architecture for content routing support in the Internet', Proceedings of 3rd Usenix Symposium on Internet Technologies and Systems, 2001, pp. 37-48.
"CCNx," http://ccnx.org/. downloaded Mar. 11, 2015.
"Content Delivery Network", Wikipedia, Dec. 10, 2011, http://en.wikipedia.org/w/index.php?title=Content_delivery_network&oldid=465077460.
"Digital Signature" archived on Aug. 31, 2009 at http://web.archive.org/web/20090831170721/http://en.wikipedia.org/wiki/Digital_signature.
"Introducing JSON," http://www.json.org/. downloaded Mar. 11, 2015.
"Microsoft PlayReady," http://www.microsoft.com/playready/. downloaded Mar. 11, 2015.
"Pursuing a pub/sub internet (PURSUIT)," http://www.fp7-pursuit.ew/PursuitWeb/. downloaded Mar. 11, 2015.
"The FP7 4WARD project," http://www.4ward-project.eu/. downloaded Mar. 11, 2015.
A. Broder and A. Karlin, "Multilevel Adaptive Hashing", Jan. 1990, pp. 43-53.
Detti, Andrea, et al. "CONET: a content centric inter-networking architecture." Proceedings of the ACM SIGCOMM workshop on Information-centric networking. ACM, 2011.
A. Wolman, M. Voelker, N. Sharma N. Cardwell, A. Karlin, and H.M. Levy, "On the scale and performance of cooperative web proxy caching," ACM SIGHOPS Operating Systems Review, vol. 33, No. 5, pp. 16-31, Dec. 1999.
Afanasyev, Alexander, et al. "Interest flooding attack and countermeasures in Named Data Networking." IFIP Networking Conference, 2013. IEEE, 2013.
B. Ahlgren et al., 'A Survey of Information-centric Networking' IEEE Commun. Magazine, Jul. 2012, pp. 26-36.
Bari, MdFaizul, et al. 'A survey of naming and routing in information-centric networks.' Communications Magazine, IEEE 50.12 (2012): 44-53.

(56) References Cited

OTHER PUBLICATIONS

Baugher, Mark et al., "Self-Verifying Names for Read-Only Named Data", 2012 IEEE Conference on Computer Communications Workshops (INFOCOM WKSHPS), Mar. 2012, pp. 274-279.

Brambley, Michael, A novel, low-cost, reduced-sensor approach for providing smart remote monitoring and diagnostics for packaged air conditioners and heat pumps. Pacific Northwest National Laboratory, 2009.

C.A. Wood and E. Uzun, "Flexible end-to-end content security in CCN," in Proc. IEEE CCNC 2014, Las Vegas, CA, USA, Jan. 2014.

Carzaniga, Antonio, Matthew J. Rutherford, and Alexander L. Wolf. 'A routing scheme for content-based networking.' INFOCOM 2004. Twenty-third Annual Joint Conference of the IEEE Computer and Communications Societies. vol. 2. IEEE, 2004.

Cho, Jin-Hee, Ananthram Swami, and Ray Chen. "A survey on trust management for mobile ad hoc networks." Communications Surveys & Tutorials, IEEE 13.4 (2011): 562-583.

Compagno, Alberto, et al. "Poseidon: Mitigating interest flooding DDoS attacks in named data networking." Local Computer Networks (LCN), 2013 IEEE 38th Conference on. IEEE, 2013.

Conner, William, et al. "A trust management framework for service-oriented environments." Proceedings of the 18th international conference on World wide web. ACM, 2009.

Content Centric Networking Project (CCN) [online], http://ccnx.org/releases/latest/doc/technical/, Downloaded Mar. 9, 2015.

Content Mediator Architecture for Content-aware Networks (COMET) Project [online], http://www.comet-project.org/, Downloaded Mar. 9, 2015.

D.K. Smetters, P. Golle, and J.D. Thornton, "CCNx access control specifications," PARC, Tech. Rep., Jul. 2010.

Dabirmoghaddam, Ali, Maziar Mirzazad Barijough, and J. J. Garcia-Luna-Aceves. 'Understanding optimal caching and opportunistic caching at the edge of information-centric networks.' Proceedings of the 1st international conference on Information-centric networking. ACM, 2014.

Dijkstra, Edsger W., and Carel S. Scholten. 'Termination detection for diffusing computations.' Information Processing Letters 11.1 (1980): 1-4.

Dijkstra, Edsger W., Wim HJ Feijen, and A_J M. Van Gasteren. "Derivation of a termination detection algorithm for distributed computations." Control Flow and Data Flow: concepts of distributed programming. Springer Berlin Heidelberg, 1986. 507-512.

E. Rescorla and N. Modadugu, "Datagram transport layer security," IETF RFC 4347, Apr. 2006.

E.W. Dijkstra, W. Feijen, and A.J.M. Van Gasteren, "Derivation of a Termination Detection Algorithm for Distributed Computations," Information Processing Letter, vol. 16, No. 5, 1983.

Fayazbakhsh, S. K., Lin, Y., Tootoonchian, A., Ghodsi, A., Koponen, T., Maggs, B., & Shenker, S. {Aug. 2013,). Less pain, most of the gain: Incrementally deployable ICN. In ACM SIGCOMM Computer Communication Review (vol. 43, No. 4, pp. 147-158). ACM.

G. Tyson, S. Kaune, S. Miles, Y. El-Khatib, A. Mauthe, and A. Taweel, "A trace-driven analysis of caching in content-centric networks," in Proc. IEEE ICCCN 2012, Munich, Germany, Jul.-Aug. 2012, pp. 1-7.

G. Wang, Q. Liu, and J. Wu, "Hierarchical attribute-based encryption for fine-grained access control in cloud storage services," in Proc. ACM CCS 2010, Chicago, IL, USA, Oct. 2010, pp. 735-737.

G. Xylomenos et al., "A Survey of Information-centric Networking Research," IEEE Communication Surveys and Tutorials, Jul. 2013.

Garcia, Humberto E., Wen-Chiao Lin, and Semyon M. Meerkov. "A resilient condition assessment monitoring system." Resilient Control Systems (ISRCS), 2012 5th International Symposium on. IEEE, 2012.

Garcia-Luna-Aceves, Jose J. 'A unified approach to loop-free routing using distance vectors or link states.' ACM SIGCOMM Computer Communication Review. vol. 19. No. 4. ACM, 1989.

Garcia-Luna-Aceves, Jose J. 'Name-Based Content Routing in Information Centric Networks Using Distance Information' Proc ACM ICN 2014, Sep. 2014.

Ghali, Cesar, GeneTsudik, and Ersin Uzun. "Needle in a Haystack: Mitigating Content Poisoning in Named-Data Networking." Proceedings of NDSS Workshop on Security of Emerging Networking Technologies (SENT). 2014.

Ghodsi, Ali, et al. "Information-centric networking: seeing the forest for the trees." Proceedings of the 10th ACM Workshop on Hot Topics in Networks. ACM, 2011.

Ghodsi, Ali, et al. "Naming in content-oriented architectures." Proceedings of the ACM SIGCOMM workshop on Information-centric networking. ACM, 2011.

Gupta, Anjali, Barbara Liskov, and Rodrigo Rodrigues. "Efficient Routing for Peer-to-Peer Overlays." NSDI. vol. 4. 2004.

Heckerman, David, John S. Breese, and Koos Rommelse. "Decision-Theoretic Troubleshooting." Communications of the ACM. 1995.

Heinemeier, Kristin, et al. "Uncertainties in Achieving Energy Savings from HVAC Maintenance Measures in the Field." ASHRAE Transactions 118.Part 2 {2012).

Herlich, Matthias et al., "Optimizing Energy Efficiency for Bulk Transfer Networks", Apr. 13, 2010, pp. 1-3, retrieved for the Internet: URL:http://www.cs.uni-paderborn.de/fileadmin/informationik/ag-karl/publications/miscellaneous/optimizing.pdf (retrieved on Mar. 9, 2012).

https://code.google.com/p/ccnx-trace/.

I. Psaras, R.G. Clegg, R. Landa, W.K. Chai, and G. Pavlou, "Modelling and evaluation of CCN-caching trees," in Proc. IFIP Networking 2011, Valencia, Spain, May 2011, pp. 78-91.

Intanagonwiwat, Chalermek, Ramesh Govindan, and Deborah Estrin. 'Directed diffusion: a scalable and robust communication paradigm for sensor networks.' Proceedings of the 6th annual international conference on Mobile computing and networking. ACM, 2000.

J. Aumasson and D. Bernstein, "SipHash: a fast short-input PRF", Sep. 18, 2012.

J. Hur, "Improving security and efficiency in attribute-based data sharing," IEEE Trans. Knowledge Data Eng., vol. 25, No. 10, pp. 2271-2282, Oct. 2013.

Jacobson et al., "Custodian-Based Information Sharing," Jul. 2012, IEEE Communications Magazine: vol. 50 Issue 7 (p. 3843).

Ji, Kun, et al. "Prognostics enabled resilient control for model-based building automation systems." Proceedings of the 12th Conference of International Building Performance Simulation Association. 2011.

K. Liang, L. Fang, W. Susilo, and D.S. Wong, "A Ciphertext-policy attribute-based proxy re-encryption with chosen-ciphertext security," in Proc. INCoS 2013, Xian, China, Sep. 2013, pp. 552-559.

Katipamula, Srinivas, and Michael R. Brambley. "Review article: methods for fault detection, diagnostics, and prognostics for building systemsa review, Part I." HVAC&R Research 11.1 (2005): 3-25.

Katipamula, Srinivas, and Michael R. Brambley. "Review article: methods for fault detection, diagnostics, and prognostics for building systemsa review, Part II." HVAC&R Research 11.2 (2005): 169-187.

L. Zhou, V. Varadharajan, and M. Hitchens, "Achieving secure role-based access control on encrypted data in cloud storage," IEEE Trans. Inf. Forensics Security, vol. 8, No. 12, pp. 1947-1960, Dec. 2013.

Li, Wenjia, Anupam Joshi, and Tim Finin. "Coping with node misbehaviors in ad hoc networks: A multi-dimensional trust management approach." Mobile Data Management (MDM), 2010 Eleventh International Conference on. IEEE, 2010.

Lopez, Javier, et al. "Trust management systems for wireless sensor networks: Best practices." Computer Communications 33.9 (2010): 1086-1093.

M. Green and G. Ateniese, "Identity-based proxy re-encryption," in Proc. ACNS 2007, Zhuhai, China, Jun. 2007, pp. 288-306.

M. Ion, J. Zhang, and E.M. Schooler, "Toward content-centric privacy in ICN: Attribute-based encryption and routing," in Proc. ACM SIGCOMM ICN 2013, Hong Kong, China, Aug. 2013, pp. 39-40.

(56) References Cited

OTHER PUBLICATIONS

M. Naor and B. Pinkas "Efficient trace and revoke schemes," in Proc. FC 2000, Anguilla, British West Indies, Feb. 2000, pp. 1-20.
M. Nystrom, S. Parkinson, A. Rusch, and M. Scott, "PKCS#12: Personal information exchange syntax v. 1.1," IETF RFC 7292, K. Moriarty, Ed., Jul. 2014.
M. Parsa and J.J. Garcia-Luna-Aceves, "A Protocol for Scalable Loop-free Multicast Routing." IEEE JSAC, Apr. 1997.
M. Walfish, H. Balakrishnan, and S. Shenker, "Untangling the web from DNS," in Proc. USENIX NSDI 2004, Oct. 2010, pp. 735-737.
Matocha, Jeff, and Tracy Camp. 'A taxonomy of distributed termination detection algorithms.' Journal of Systems and Software 43.3 (1998): 207-221.
Matteo Varvello et al., "Caesar: A Content Router for High Speed Forwarding", ICN 2012, Second Edition on Information-Centric Networking, New York, Aug. 2012.
McWilliams, Jennifer A., and Iain S. Walker. "Home Energy Article: A Systems Approach to Retrofitting Residential HVAC Systems." Lawrence Berkeley National Laboratory (2005).
Mobility First Project [online], http://mobilityfirst.winlab.rutgers.edu/, Downloaded Mar. 9, 2015.
Narasimhan, Sriram, and Lee Brownston. "HyDE—A General Framework for Stochastic and Hybrid Modelbased Diagnosis." Proc. DX 7 (2007): 162-169.
NDN Project [online], http://www.named-data.net/, Downloaded Mar. 9, 2015.
Omar, Mawloud, Yacine Challal, and Abdelmadjid Bouabdallah. "Certification-based trust models in mobile ad hoc networks: A survey and taxonomy." Journal of Network and Computer Applications 35.1 (2012): 268-286.
P. Mahadevan, E.Uzun, S. Sevilla, and J. Garcia-Luna-Aceves, "CCN-krs: A key resolution service for ccn," in Proceedings of the 1st International Conference on Information-centric Networking, Ser. Inc 14 New York, NY, USA: ACM, 2014, pp. 97-106. [Online]. Available: http://doi.acm.org/10.1145/2660129.2660154.
S. Deering, "Multicast Routing in Internetworks and Extended LANs," Proc. ACM SIGCOMM '88, Aug. 1988.
S. Deering et al., "The PIM architecture for wide-area multicast routing," IEEE/ACM Trans, on Networking, vol. 4, No. 2, Apr. 1996.
S. Jahid, P. Mittal, and N. Borisov, "Easier: Encryption-based access control in social network with efficient revocation," in Proc. ACM ASIACCS 2011, Hong Kong, China, Mar. 2011, pp. 411-415.
S. Kamara and K. Lauter, "Cryptographic cloud storage," in Proc. FC 2010, Tenerife, Canary Islands, Spain, Jan. 2010, pp. 136-149.
S. Kumar et al. "Peacock Hashing: Deterministic and Updatable Hashing for High Performance Networking," 2008, pp. 556-564.
S. Misra, R. Tourani, and N.E. Majd, "Secure content delivery in information-centric networks: Design, implementation, and analyses," in Proc. ACM SIGCOMM ICN 2013, Hong Kong, China, Aug. 2013, pp. 73-78.
S. Yu, C. Wang, K. Ren, and W. Lou, "Achieving secure, scalable, and fine-grained data access control in cloud computing," in Proc. IEEE INFOCOM 2010, San Diego, CA, USA, Mar. 2010, pp. 1-9.
S.J. Lee, M. Gerla, and C. Chiang, "On-demand Multicast Routing Protocol in Multihop Wireless Mobile Networks," Mobile Networks and Applications, vol. 7, No. 6, 2002.
Scalable and Adaptive Internet Solutions (SAIL) Project [online], http://sail-project.eu/ Downloaded Mar. 9, 2015.
Schein, Jeffrey, and Steven T. Bushby. A Simulation Study of a Hierarchical, Rule-Based Method for System-Level Fault Detection and Diagnostics in HVAC Systems. US Department of Commerce,[Technology Administration], National Institute of Standards and Technology, 2005.
Shani, Guy, Joelle Pineau, and Robert Kaplow. "A survey of point-based POMDP solvers." Autonomous Agents and Multi-Agent Systems 27.1 (2013): 1-51.
Sheppard, John W., and Stephyn GW Butcher. "A formal analysis of fault diagnosis with d-matrices." Journal of Electronic Testing 23.4 (2007): 309-322.
Shneyderman, Alex et al., 'Mobile VPN: Delivering Advanced Services in Next Generation Wireless Systems', Jan. 1, 2003, pp. 3-29.
Solis, Ignacio, and J. J. Garcia-Luna-Aceves. 'Robust content dissemination in disrupted environments.' proceedings of the third ACM workshop on Challenged networks. ACM, 2008.
Sun, Ying, and Daniel S. Weld. "A framework for model-based repair." AAAI. 1993.
T. Ballardie, P. Francis, and J. Crowcroft, "Core Based Trees (CBT)," Proc. ACM SIGCOMM '88, Aug. 1988.
T. Dierts, "The transport layer security (TLS) protocol version 1.2," IETF RFC 5246, 2008.
T. Koponen, M. Chawla, B.-G. Chun, A. Ermolinskiy, K.H. Kim, S. Shenker, and I. Stoica, 'A data-oriented (and beyond) network architecture,' ACM SIGCOMM Computer Communication Review, vol. 37, No. 4, pp. 181-192, Oct. 2007.
V. Goyal, 0. Pandey, A. Sahai, and B. Waters, "Attribute-based encryption for fine-grained access control of encrypted data," in Proc. ACM CCS 2006, Alexandria, VA, USA, Oct.-Nov. 2006, pp. 89-98.
V. Jacobson, D.K. Smetters, J.D. Thornton, M.F. Plass, N.H. Briggs, and R.L. Braynard, 'Networking named content,' in Proc. ACM CoNEXT 2009, Rome, Italy, Dec. 2009, pp. 1-12.
Verma, Vandi, Joquin Fernandez, and Reid Simmons. "Probabilistic models for monitoring and fault diagnosis." The Second IARP and IEEE/RAS Joint Workshop on Technical Challenges for Dependable Robots in Human Environments. Ed. Raja Chatila. Oct. 2002.
Vutukury, Srinivas, and J. J. Garcia-Luna-Aceves. A simple approximation to minimum-delay routing. vol. 29. No. 4. ACM, 1999.
W.-G. Tzeng and Z.-J. Tzeng, "A public-key traitor tracing scheme with revocation using dynamic shares," in Proc. PKC 2001, Cheju Island, Korea, Feb. 2001, pp. 207-224.
Waldvogel, Marcel "Fast Longest Prefix Matching: Algorithms, Analysis, and Applications", a dissertation submitted to the Swiss Federal Institute of Technology Zurich, 2002.
Walker, Iain S. Best practices guide for residential HVAC Retrofits. No. LBNL-53592. Ernest Orlando Lawrence Berkeley National Laboratory, Berkeley, CA (US), 2003.
Wang, Jiangzhe et al.,"DMND: Collecting Data from Mobiles Using Named Data", Vehicular Networking Conference, 2010 IEEE, pp. 49-56.
Xylomenos, George, et al. "A survey of information-centric networking research." Communications Surveys & Tutorials, IEEE 16.2 (2014): 1024-1049.
Yi, Cheng, et al. 'A case for stateful forwarding plane.' Computer Communications 36.7 (2013): 779-791.
Yi, Cheng, et al. 'Adaptive forwarding in named data networking.' ACM SIGCOMM computer communication review 42.3 (2012): 62-67.
Zahariadis, Theodore, et al. "Trust management in wireless sensor networks." European Transactions on Telecommunications 21.4 (2010): 386-395.
Zhang, et al., "Named Data Networking (NDN) Project", http://www.parc.com/publication/2709/named-data-networking-ndn-project.html, Oct. 2010, NDN-0001, PARC Tech Report.
Zhang, Lixia, et al. 'Named data networking.' ACM SIGCOMM Computer Communication Review 44.3 {2014): 66-73.
D. Trossen and G. Parisis, "Designing and realizing and information-centric internet," IEEE Communications Magazing, vol. 50, No. 7, pp. 60-67, Jul. 2012.
Gasti, Paolo et al., 'DoS & DDoS in Named Data Networking', 2013 22nd International Conference on Computer Communications and Networks (ICCCN), Aug. 2013, pp. 1-7.
J. Hur and D.K. Noh, "Attribute-based access control with efficient revocation in data outsourcing systers," IEEE Trans. Parallel Distrib. Syst, vol. 22, No. 7, pp. 1214-1221, Jul. 2011.
Kaya et al., "A Low Power Lookup Technique for Multi-Hashing Network Applications", 2006 IEEE Computer Society Annual Symposium on Emerging VLSI Technologies and Architectures, Mar. 2006.
Hoque et al., 'NLSR: Named-data Link State Routing Protocol', Aug. 12, 2013, ICN 2013, pp. 15-20.

(56) References Cited

OTHER PUBLICATIONS

Nadeem Javaid, "Analysis and design of quality link metrics for routing protocols in Wireless Networks", PhD Thesis Defense, Dec. 15, 2010, Universete Paris-Est.

Wetherall, David, "Active Network vision and reality: Lessons form a capsule-based system", ACM Symposium on Operating Systems Principles, Dec. 1, 1999. pp. 64-79.

Kulkarni A.B. et al., "Implementation of a prototype active network", IEEE, Open Architectures and Network Programming, Apr. 3, 1998, pp. 130-142.

Xie et al. "Collaborative Forwarding and Caching in Content Centric Networks", Networking 2012.

Amadeo et al. "Design and Analysis of a Transport-Level Solution for Content-Centric VANETs", University "Mediterranea" of Reggio Calabria, Jun. 15, 2013.

Lui et al. (A TLV-Structured Data Naming Scheme for Content-Oriented Networking, pp. 5822-5827, International Workshop on the Network of the Future, Communications (ICC), 2012 IEEE International Conference on Jun. 10-15, 2012).

Peter Dely et al. "OpenFlow for Wireless Mesh Networks" Computer Communications and Networks, 2011 Proceedings of 20th International Conference on, IEEE, Jul. 31, 2011 (Jul. 31, 2011), pp. 1-6.

Garnepudi Parimala et al "Proactive, reactive and hybrid multicast routing protocols for Wireless Mesh Networks", 2013 IEEE International Conference on Computational Intelligence and Computing Research, IEEE, Dec. 26, 2013, pp. 1-7.

Tiancheng Zhuang et al. "Managing Ad Hoc Networks of Smartphones", International Journal of Information and Education Technology, Oct. 1, 2013.

Carofiglio, et al., "Optimal multipath congestion control and request forwarding in Information-Centric Networks," 2013 21st IEEE International Conference on Network Protocols (ICNP), Oct. 2013, 10 pages.

International Search Report and Written Opinion in counterpart International Application No. PCT/US2017/020794, dated Jun. 13, 2017, 10 pages.

Carofiglio, et al., "Multipath Congestion Control in Content-Centric Networks," 2013 IEEE Conference on Computer Communications Workshops (INFOCOM WKSHPS), Apr. 2013, 6 pages.

\* cited by examiner

METHOD AND SYSTEM FOR COLLECTING HISTORICAL NETWORK INFORMATION IN A CONTENT CENTRIC NETWORK

RELATED APPLICATIONS

The subject matter of this application is related to the subject matter in the following applications:

U.S. patent application Ser. No. 13/847,814, entitled "ORDERED-ELEMENT NAMING FOR NAME-BASED PACKET FORWARDING," by inventor Ignacio Solis, filed 20 Mar. 2013 (hereinafter "U.S. patent application Ser. No. 13/847,814");

U.S. patent application Ser. No. 12/338,175, entitled "CONTROLLING THE SPREAD OF INTERESTS AND CONTENT IN A CONTENT CENTRIC NETWORK," by inventors Van L. Jacobson and Diana K. Smetters, filed 18 Dec. 2008 (hereinafter "U.S. patent application Ser. No. 12/338,175");

U.S. patent application Ser. No. 14/334,530, entitled "INTEREST RETURN CONTROL MESSAGE," by inventors Marc E. Mosko, Ignacio Solis, and Ersin Uzun, filed 17 Jul. 2014 (hereinafter "U.S. patent application Ser. No. 14/334,530"); and U.S. patent application Ser. No. 14/746,490, entitled "TRANSPORT STACK NAME SCHEME AND IDENTITY MANAGEMENT," by inventors Christopher A. Wood and Glenn C. Scott, filed 22 Jun. 2015 (hereinafter "U.S. patent application Ser. No. 14/746,490");

the disclosures of which are herein incorporated by reference in their entirety.

BACKGROUND

Field

This disclosure is generally related to distribution of digital content. More specifically, this disclosure is related to a system for collecting historical network information in a content centric network, which facilitates users of the system to increase network efficiency.

Related Art

The proliferation of the Internet and e-commerce continues to create a vast amount of digital content. Content centric network (CCN) architectures have been designed to facilitate accessing and processing such digital content. A CCN includes entities, or nodes, such as network clients, forwarders (e.g., routers), and content producers, which communicate with each other by sending interest packets for various content items and receiving content object packets in return. CCN interests and content objects are identified by their unique names, which are typically hierarchically structured variable length identifiers (HSVLI). An HSVLI can include contiguous name components ordered from a most general level to a most specific level. A CCN name prefix, or namespace, may include one or more contiguous name components beginning from the most general level.

Some transport protocols implement flow and congestion control by maintaining a window of messages (e.g., packets) sent from a client (e.g, a consumer) to a server (e.g., a content producer). Upon sending a packet, the consumer adds a packet to the window, and upon receiving a responsive packet, the consumer removes a packet from the window. For a window with a size of "w," only w messages can be outstanding at any given time. Some transport protocols (such as TCP) use a sliding window such that w is a variable that changes dynamically based on network conditions. For example, if the protocol determines congestion, e.g., due to heavy traffic of neighboring nodes, the consumer can decrease w so that fewer messages are sent to the network. Similarly, if the protocol determines that the network is not congested, the consumer can increase w so that more messages can be sent for better throughput and latency performance.

While a CCN brings many desired features to a network, some issues remain unsolved with enabling a CCN transport protocol to provide clients or consumers with historical network information to increase network efficiency.

SUMMARY

One embodiment provides a system that facilitates collection of historical network information. During operation, the system monitors a plurality of packets which include outgoing interests and corresponding incoming content objects, wherein a name for an interest is a hierarchically structured variable length identifier that includes contiguous name components ordered from a most general level to a most specific level. The system collects historical information associated with the packets based on name prefixes of the packets, wherein a name prefix includes one or more contiguous name components. In response to receiving a query from a requesting entity for the historical information, the system transmits the historical information, thereby facilitating the requesting entity to use the historical information to increase network efficiency.

In some embodiments, the method is performed by a collector component in the system, wherein the collector component resides in one or more of: an application; a single stack; a shared stack; a single forwarder; a shared forwarder; and any node in a network.

In some embodiments, the requesting entity is one or more of: an application associated with a first stack, wherein the collector component resides in the first stack; an application associated with a second stack that is different from the first stack; a stack component of the first stack, wherein the stack component is different from the collector component; a stack component of the second stack; and any other element or node in the network.

In some embodiments, the system stores the collected historical information.

In some embodiments, the historical information associated with the packets is one or more of: a round trip time that begins when an outgoing interest is transmitted and ends when a corresponding incoming content object is received; a number of outgoing interests for which a corresponding incoming content object has not been received; a number of outgoing interests for which a corresponding incoming content object is received based on a predetermined amount of time or the round trip time; a number of bytes correctly retrieved based on the predetermined amount of time or the round trip time; a number of outgoing interests that time out based on the predetermined amount of time or the round trip time; a number of outgoing interests which are retransmitted based on the predetermined amount of time or the round trip time; a number of re-transmitted outgoing interests that time out based on the predetermined amount of time or the round trip time; a number of interest return messages received based on the predetermined amount of time or the round trip time, wherein an interest return message is received in response to an outgoing interest and is identified based on a code indicated in the message; and a number of outgoing interests aggregated based on the predetermined amount of time or the round trip time.

In some embodiments, the historical information associated with the packets is one or more of: a number of active upstream paths identified for a given time; a strategy for forwarding packets; a first number of transmitted original interests, wherein an original interest is not a re-transmitted interest, and wherein the first number of original interests include names that share one or more name prefixes; a second number of transmitted original interests, wherein the second number of original interests include names that do not share any name prefixes; a first number of active entries in a forwarding information base, wherein the first number of entries include names that share one or more name prefixes; and a second number of active entries in a forwarding information base, wherein the second number of entries include names that do not share any name prefixes In some embodiments, the system is a client computing device, an intermediate node, or a content producing device.

In some embodiments, collecting the historical information is further based on one or more of: one or more name prefixes; a routable name prefix which includes one or more contiguous name components beginning from the most general level; a time of day; a day of the week; a number of upstream peers that are retrieving data; and a feature based on time or space.

In some embodiments, the monitored plurality of packets further includes incoming interests and corresponding outgoing content objects.

In some embodiments, the historical information associated with the packets is one or more of: a round trip time that begins when an incoming interest is received and ends when a corresponding incoming content object is transmitted; a number of incoming interests for which a corresponding outgoing content object has not been transmitted; a number of incoming interests for which a corresponding outgoing content object is transmitted based on a predetermined amount of time or the round trip time; a number of bytes correctly retrieved based on the predetermined amount of time or the round trip time; a number of incoming interests that time out based on the predetermined amount of time or the round trip time; a number of re-transmitted incoming interests based on the predetermined amount of time or the round trip time; a number of re-transmitted incoming interests that time out based on the predetermined amount of time or the round trip time; a number of interest return messages transmitted based on the predetermined amount of time or the round trip time, wherein an interest return message is received in response to an outgoing interest and is identified based on a code indicated in the message; and a number of incoming interests aggregated based on the predetermined amount of time or the round trip time.

BRIEF DESCRIPTION OF THE FIGURES

In the figures, like reference numerals refer to the same figure elements.

DETAILED DESCRIPTION

Figure 1:
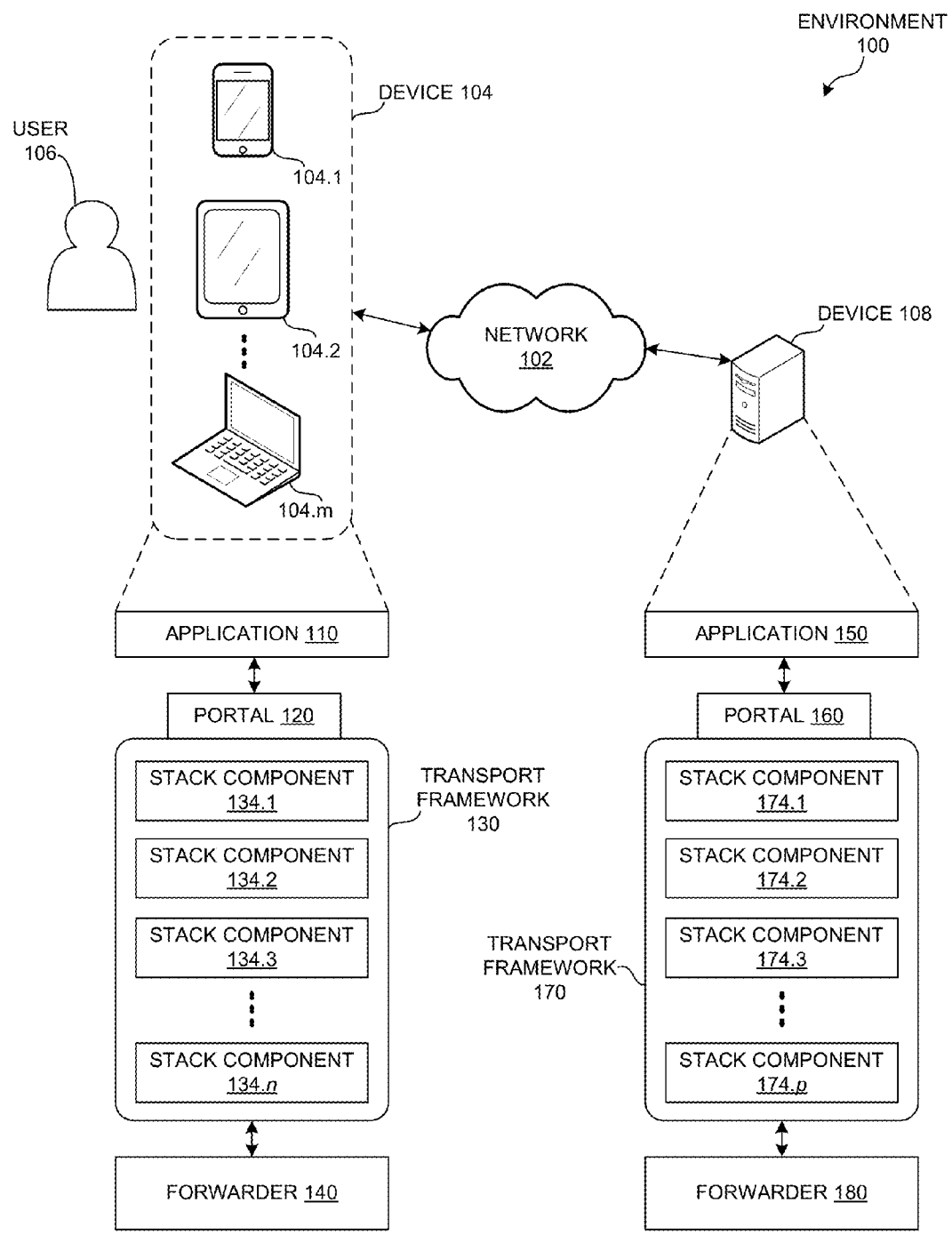
FIG. 1 illustrates an exemplary environment which facilitates increased network efficiency by collecting historical network information in a content centric network, in accordance with an embodiment of the present invention.

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

Overview

Embodiments of the present invention provide a system for collecting historical network information in a CCN which facilitates a system user to perform a function that increases overall network efficiency. One aspect of network efficiency is flow and congestion control. Some transport protocols implement this control by maintaining a sliding window of a size "w" that changes based on network conditions. The window size w is dynamically changed based on the perceived and measured performance of the network. For example, if the protocol determines congestion, e.g., due to heavy traffic of neighboring nodes, a consumer can decrease w so that fewer messages are sent to the network. Similarly, if the protocol determines that the network is not congested, the consumer can increase w so that more messages can be sent for better throughput and latency performance.

In a CCN transport protocol (e.g., ICP, CCTCP and other variants), a similar TCP-like mechanism is used to control flow and congestion by maintaining a window of outstanding interests. Recall that traffic in a CCN is symmetric, where a single interest returns a corresponding content object (or an interest return, as described in U.S. patent application Ser. No. 14/334,530). Thus, historical information regarding a given CCN namespace (e.g., a name prefix) may be collected by a network entity through which CCN packets (e.g., interests and content objects) flow. Embodiments of the present invention provide a system that allows a generic "collector component" to collect information relating to outgoing interests and incoming content objects, and to incoming interests and outgoing content objects. This collector component can reside inside an application, a single or shared stack, a single or shared forwarder, or any node in the network.

The system can collect historical information for each namespace identified in a set of messages. A namespace is a CCN prefix (i.e., one or more contiguous name components beginning from the most general level) and a CCN name may have multiple namespaces or prefixes. For example, the name "/a/b/c" has three namespaces: "/a"; "/a/b"; and "/a/b/c."

In CCN, each piece of content is individually named, and each piece of data is bound to a unique name that distinguishes the data from any other piece of data, such as other versions of the same data or data from other sources. This unique name allows a network device to request the data by disseminating a request or an interest that indicates the unique name, and can obtain the data independent from the data's storage location, network location, application, and means of transportation. The following terms are used to describe the CCN architecture:

Content Object (or "content object"): A single piece of named data, which is bound to a unique name. Content Objects are "persistent," which means that a Content Object can move around within a computing device, or across different computing devices, but does not change. If any component of the Content Object changes, the entity that made the change creates a new Content Object that includes the updated content, and binds the new Content Object to a new unique name.

Unique Names: A name in a CCN is typically location independent and uniquely identifies a Content Object. A data-forwarding device can use the name or name prefix to forward a packet toward a network node that generates or stores the Content Object, regardless of a network address or physical location for the Content Object. In some embodiments, the name may be a hierarchically structured variable-length identifier (HSVLI). The HSVLI can be divided into several hierarchical components, which can be structured in various ways. For example, the individual name components parc, home, ccn, and test.txt can be structured in a left-oriented prefix-major fashion to form the name "/parc/home/ccn/test.txt." Thus, the name "/parc/home/ccn" can be a "parent" or "prefix" of "/parc/home/ccn/test.txt." Additional components can be used to distinguish between different versions of the content item, such as a collaborative document.

In some embodiments, the name can include an identifier, such as a hash value that is derived from the Content Object's data (e.g., a checksum value) and/or from elements of the Content Object's name. A description of a hash-based name is described in U.S. patent application Ser. No. 13/847,814, which is herein incorporated by reference. A name can also be a flat label. Hereinafter, "name" is used to refer to any name for a piece of data in a name-data network, such as a hierarchical name or name prefix, a flat name, a fixed-length name, an arbitrary-length name, or a label (e.g., a Multiprotocol Label Switching (MPLS) label).

Interest (or "interest"): A packet that indicates a request for a piece of data, and includes a name (or a name prefix) for the piece of data. A data consumer can disseminate a request or Interest across an information-centric network, which CCN/NDN routers can propagate toward a storage device (e.g., a cache server) or a data producer that can provide the requested data to satisfy the request or Interest.

The methods disclosed herein are not limited to CCN networks and are applicable to other architectures as well. A description of a CCN architecture is described in U.S. patent application Ser. No. 12/338,175, which is herein incorporated by reference.

Exemplary Network and Communication

FIG. 1 illustrates an exemplary environment 100 which facilitates increased network efficiency by collecting historical network information in a content centric network, in accordance with an embodiment of the present invention. Computing environment 100 can include a computer network 102, such as a CCN. Environment 100 can also include a user 106 associated with a local computing device 104, and a remote computing device 108. Devices 104 and 108 can have internal transport stacks (e.g., associated with transport frameworks 130 and 170, respectively) that exchange network packets with each other over network 102.

In a traditional IP architecture, a forwarder is an IP-based forwarder that looks at the header of a packet to determine the source and the destination for the packet, and forwards the packet to the destination. The stack performs TCP/UDP, and an application interacts with the stack via a socket. In contrast, device 104 of the present invention does not use a conventional "stack." Rather, device 104 via an application 110 can request a portal API instance corresponding to a portal 120 which corresponds to transport framework 130. Similarly, device 108 via an application 150 can request a portal API instance corresponding to a portal 160 which corresponds to transport framework 170.

Device 104 can include any computing device coupled to network 102, such as a smartphone 104.1, a tablet computer 104.2, and/or a server or personal computer 104.m. Specifically, device 104 can include application 110 which communicates via portal 120 with transport framework 130. Transport framework 130 can include stack components 134.1-134.n. Device 104 can also include forwarder 140 (e.g., a network interface card, or a router in a local area network) which can transfer packets between a stack (and individual stack components) of transport framework 130 and network 102. Similarly, device 108 can include any computing device coupled to network 102, such as a server or an end host device. Device 108 can include application 150 which communicates via portal 160 with transport framework 170. Transport framework 170 can include stack components 174.1-174.p. Device 108 can also include a forwarder 180 which can transfer packets between a stack (and individual stack components) of transport framework 170 and network 102. Forwarders 140 and 180 can also facilitate the transfer of packets directly between individual stack components 134.1-134.n and 174.1-174.p, respectively.

Exemplary Transport Frameworks

Figure 2A:
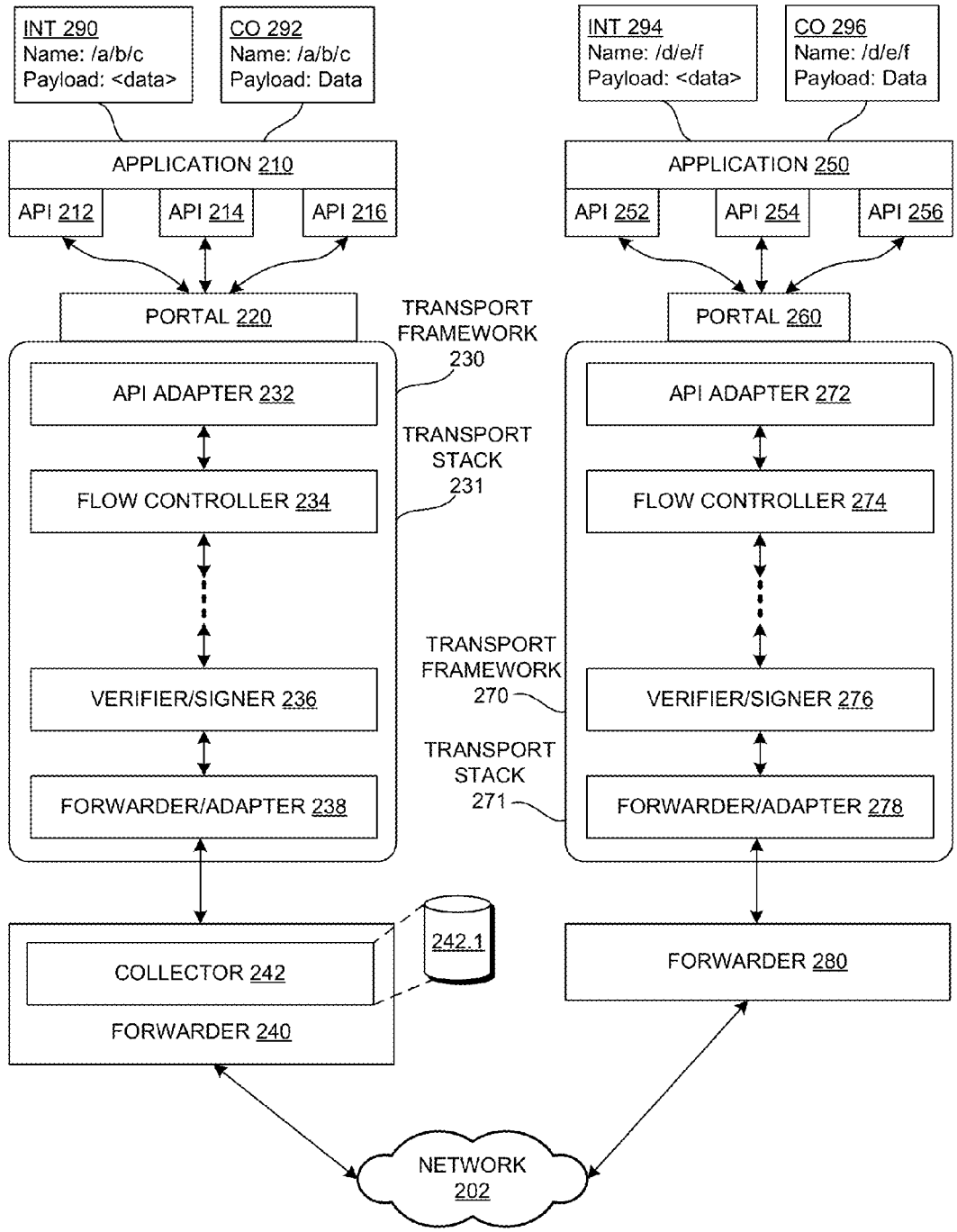
FIG. 2A illustrates an exemplary transport framework which facilitates increased network efficiency by collecting historical network information in a content centric network, wherein a collector component resides in a single forwarder, in accordance with an embodiment of the present invention.
Figure 2B:
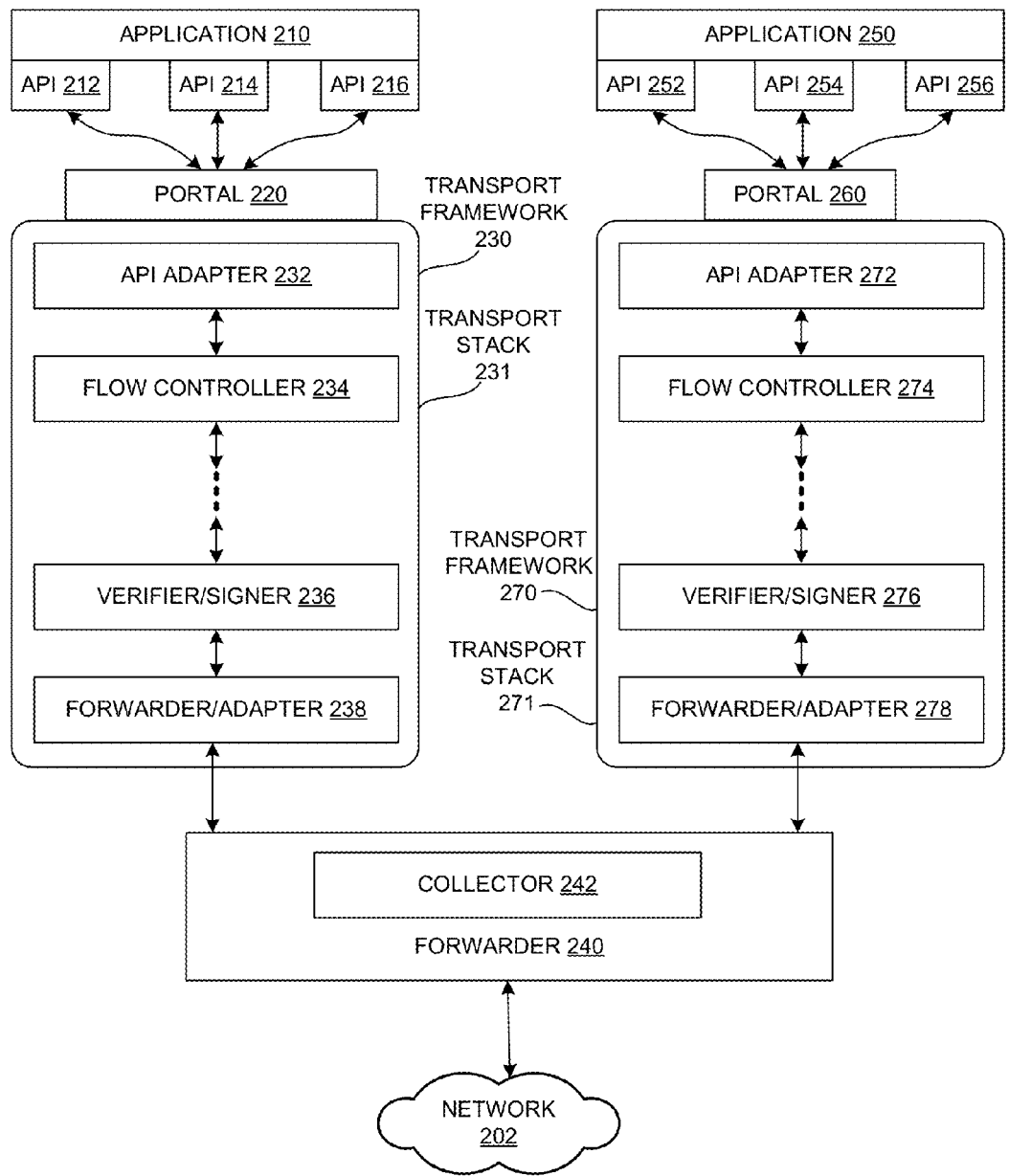
FIG. 2B illustrates an exemplary transport framework which facilitates increased network efficiency by collecting historical network information in a content centric network, wherein a collector component resides in a shared forwarder, in accordance with an embodiment of the present invention.
Figure 2C:
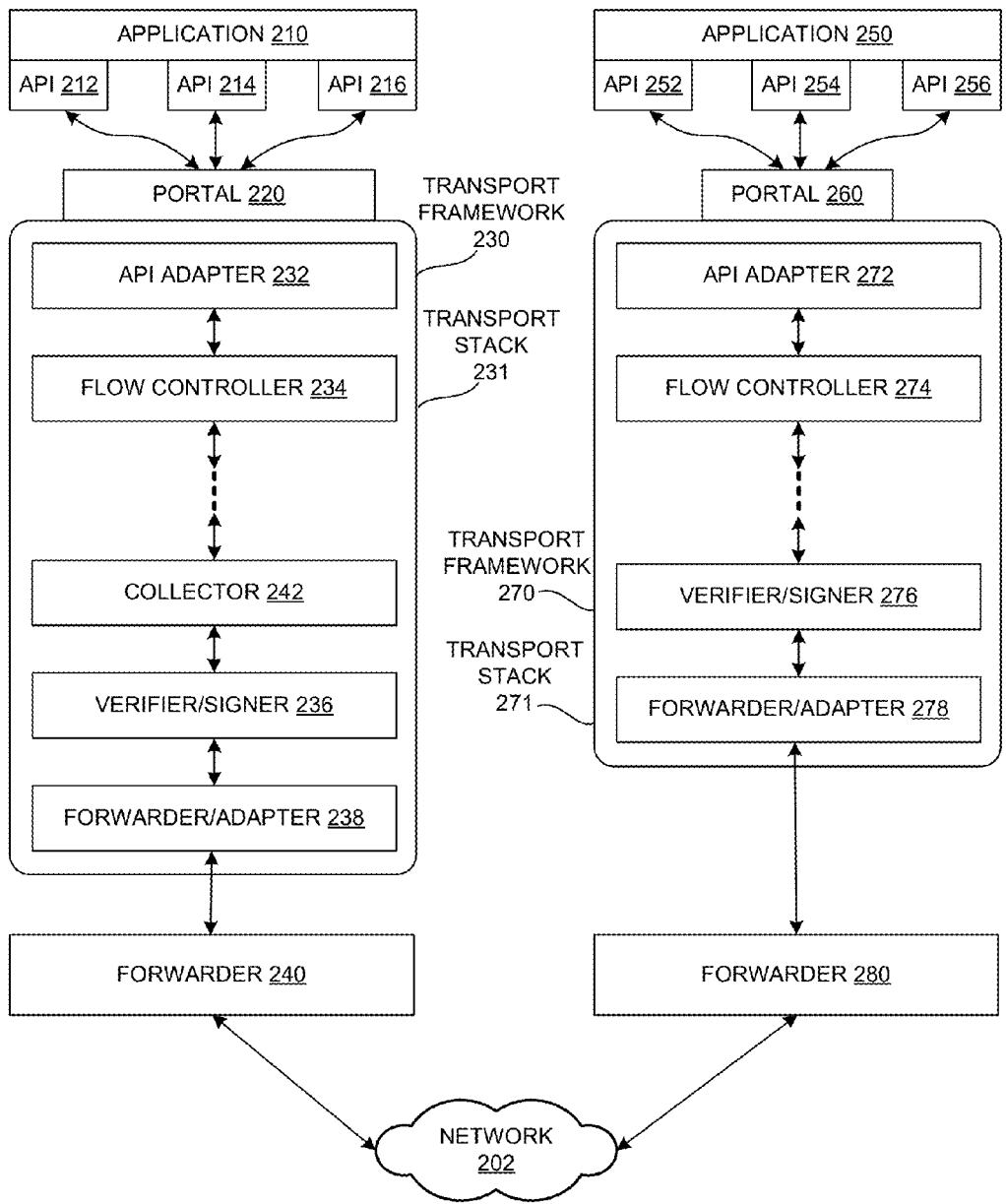
FIG. 2C illustrates an exemplary transport framework which facilitates increased network efficiency by collecting historical network information in a content centric network, wherein a collector component resides in a single transport stack of the transport framework, in accordance with an embodiment of the present invention.
Figure 2D:
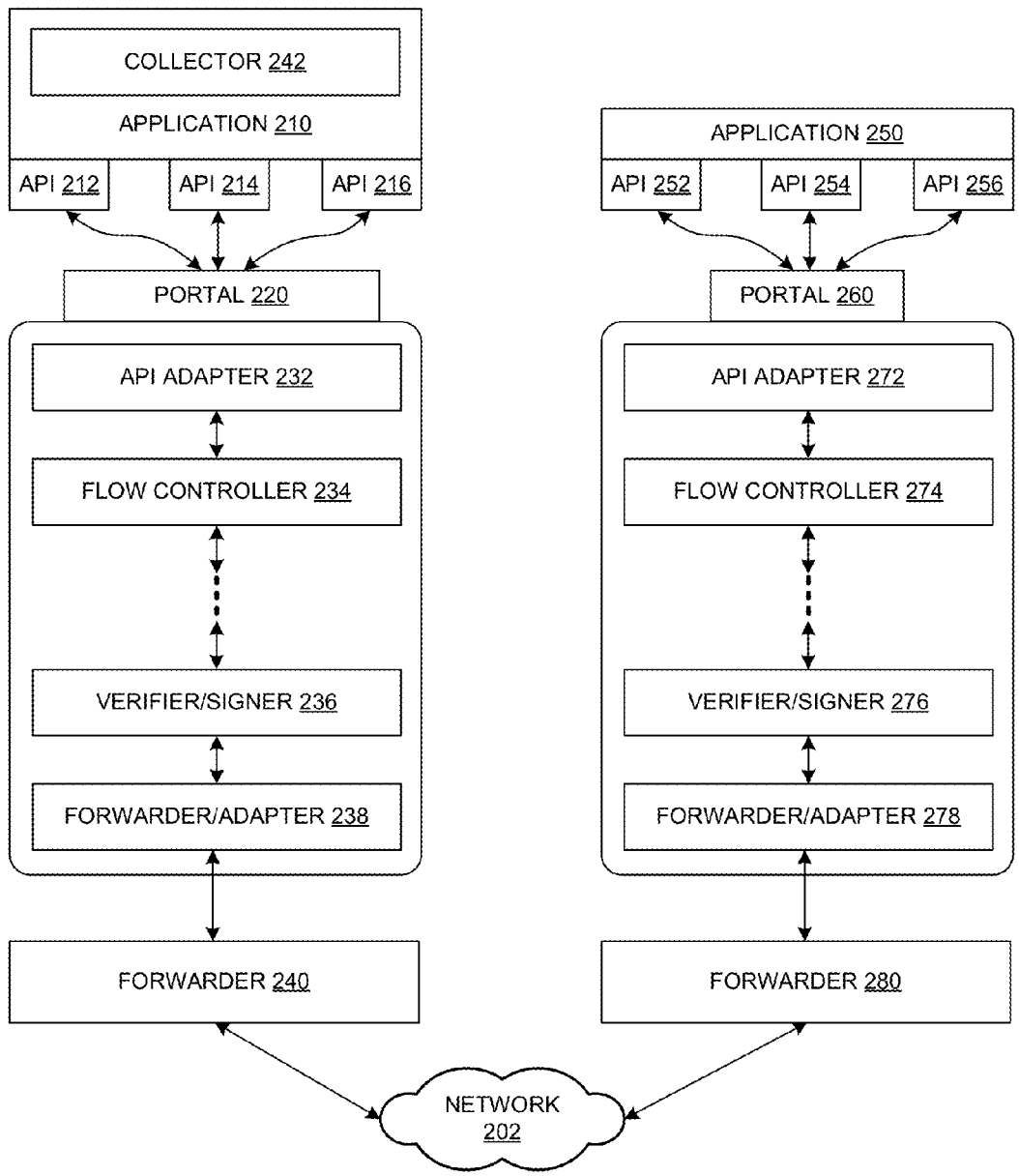
FIG. 2D illustrates an exemplary transport framework which facilitates increased network efficiency by collecting historical network information in a content centric network, wherein a collector component resides in an application associated with the transport framework, in accordance with an embodiment of the present invention.

In embodiments of the present invention, the collector component can be implemented in a CCN transport framework, and can reside in a forwarder (as in FIGS. 2A, 2B, and 2E), in a stack (as in FIG. 2C), or in an application (as in FIG. 2D). FIG. 2A illustrates an exemplary transport framework which facilitates increased network efficiency by collecting historical network information in a content centric network, wherein a collector component resides in a single forwarder, in accordance with an embodiment of the present invention. Applications 210 and 250 can reside on the same device or on difference devices which communicate via a network 202. Application 210 can use APIs 212, 214, and 216 to communicate over network 202, and APIs 212-216 can interact via a portal 220 with a transport framework 230. Transport framework 230 can include one or more transport stacks which each include multiple stack components or communication modules. In FIG. 2A, transport framework 230 depicts one transport stack (e.g., a transport stack 231) which includes stack components 232, 234, 236, and 238. An API adapter 232 can communicate between an API and a specific transport stack and transport framework 230. A flow controller 234 can shape and manage traffic, pipeline and transmit interests, and order content objects. A verifier/signer 236 can encode and sign content objects destined for a network element, decode and verify content objects destined for the application, encode interests destined for a network element, and decode interests destined for the application. A forwarder/adapter 238 can communicate with a forwarder 240. Forwarder 240 can communicate with other forwarders over network 202. A collector component 242 can reside inside forwarder 240 (or inside forwarder 280, not shown). Other stack components (not shown) can include functionality related to security (e.g., encryption, decryption, authentication, data signing, signature verification, trust assessment, and filtering), data-processing (e.g., encoding, decoding, encapsulating, decapsulating, transcoding, compression, extraction, and decompression), and storage (e.g., data storage, data retrieval from storage, deduplication, segmentation, and versioning).

Similarly, application 250 can use APIs 252, 254, and 256 to communicate over network 202, and APIs 252-256 can interact via a portal 260 with a transport framework 270. Transport framework 270 can include one or more transport stacks which each include multiple stack components or communication modules. In FIG. 2A, transport framework 270 depicts one transport stack (e.g., a transport stack 271) which includes the following stack components: an API adapter 272; a flow controller 274; a verifier/signer 276; and a forwarder/adapter 278 which can communicate with a forwarder 280. Forwarder 280 can communicate with forwarder 240 over network 202. Application 210 can be associated with a consumer or a client computing device, and application 250 can be associated with a producer or a content producing device.

During operation, collector 242 residing in forwarder 240 can monitor a plurality of packets which are outgoing interests and incoming content objects. For example, application 210 can generate and send an interest 290 with a name of "/a/b/c," via portal instance 220 through stack 231. As interest 290 leaves stack 231, it passes through forwarder 240 and collector 242. Collector 242 can monitor the time at which interest 290 is transmitted. Interest 290 can then travel over network 202, and through, e.g., forwarder 280 to be satisfied by application 250 associated with stack 271. Application 250 can generate a responsive content object 292 with a name of "/a/b/c" and a payload of "Data." Content object 293 can travel via forwarder 280 to forwarder 240 over network 202. Collector 242 can note the time that it receives responsive incoming content object 292, and record in a storage device 242.1 the round trip time associated with the multiple namespaces included in the name "/a/b/c" (i.e., "/a," "/a/b," and "/a/b/c"). Collector 242 can also store in storage device 242.1 other historical information associated with a given namespace, as described below in the section entitled "Exemplary Historical Information." Storage device 242.1 can be accessed solely by collector 242 or shared with other components or elements.

Collector 242 can also monitor an incoming interest 294 (with a name of "/d/e/f" sent by application 250 via forwarder 280) by monitoring the time at which interest 294 is received. Collector 242 can subsequently monitor and record the time that an outgoing responsive content object 296 is transmitted, where content object 296 has a name of "/d/e/f" and is sent by application 210 via forwarder 240. Collector 242 can also monitor and record the round trip time associated with the multiple namespaces included in the name "/d/e/f" (i.e., "Id," "Idle," and "/d/e/f") as well as other historical information.

Thus, collector 242 can obtain and store various historical information related to a given namespace. Any requesting entity (e.g., a user of the system) can subsequently query the component for the historical information. A requesting entity can be: an application associated with a first stack, where the collector component resides in the first stack (e.g., application 210); an application associated with a second stack that is different from the first stack (e.g., application 250); a stack component of the first stack, wherein the stack component is different from the collector component (e.g., flow controller 234); a stack component of the second stack (e.g., flow controller 274); and any other element or node in the network (not shown).

FIG. 2B illustrates an exemplary transport framework which facilitates increased network efficiency by collecting historical network information in a content centric network, wherein a collector component resides in a shared forwarder, in accordance with an embodiment of the present invention. The framework in FIG. 2B corresponds to the framework in FIG. 2A, with the difference being that applications 210 and 250, and stacks 231 and 271, respectively, are both associated with forwarder 240. In FIG. 2B, collector 242 resides in forwarder 240 and can thus monitor all traffic that passes through forwarder 240. Forwarder 240 is shared by applications 210 and 250, which can reside on the same device. Collector 242 can monitor packets transmitted to and received from network 202 in a similar fashion as described above in FIG. 2A. For example, collector 242 can monitor outgoing interests transmitted from application 210 through stack 231 via network 202 to another network node (not shown) as well as incoming responsive content objects received via network 202. Collector 242 can also monitor incoming interests transmitted to application 250 through stack 271 via network 202 as well as outgoing responsive content objects sent via network 202. Collector 242 can store historical information collected and associated with the monitored packets (e.g., in storage device 242.1, not shown in FIG. 2B).

FIG. 2C illustrates an exemplary transport framework which facilitates increased network efficiency by collecting historical network information in a content centric network, wherein a collector component resides in a single transport stack of the transport framework, in accordance with an embodiment of the present invention. The framework in FIG. 2C corresponds to the framework in FIG. 2A, with the difference being that collector 242 is a stack component that resides inside stack 231. A requesting entity can submit a query for historical information associated with a given namespace to collector 242. A transport stack name scheme, including submitting a query directly to a stack component, is described in U.S. patent application Ser. No. 14/746,490. Collector 242 can store historical information collected and associated with the monitored packets (e.g., in storage device 242.1, not shown in FIG. 2C).

FIG. 2D illustrates an exemplary transport framework which facilitates increased network efficiency by collecting historical network information in a content centric network, wherein a collector component resides in an application associated with the transport framework, in accordance with an embodiment of the present invention. The framework in FIG. 2D corresponds to the framework in FIG. 2A, with the difference being that collector 242 resides in application 210. Again, collector 242 can store historical information collected and associated with the monitored packets (e.g., in storage device 242.1, not shown in FIG. 2D).

Local Message Stream Co-Processor Example

Figure 2E:
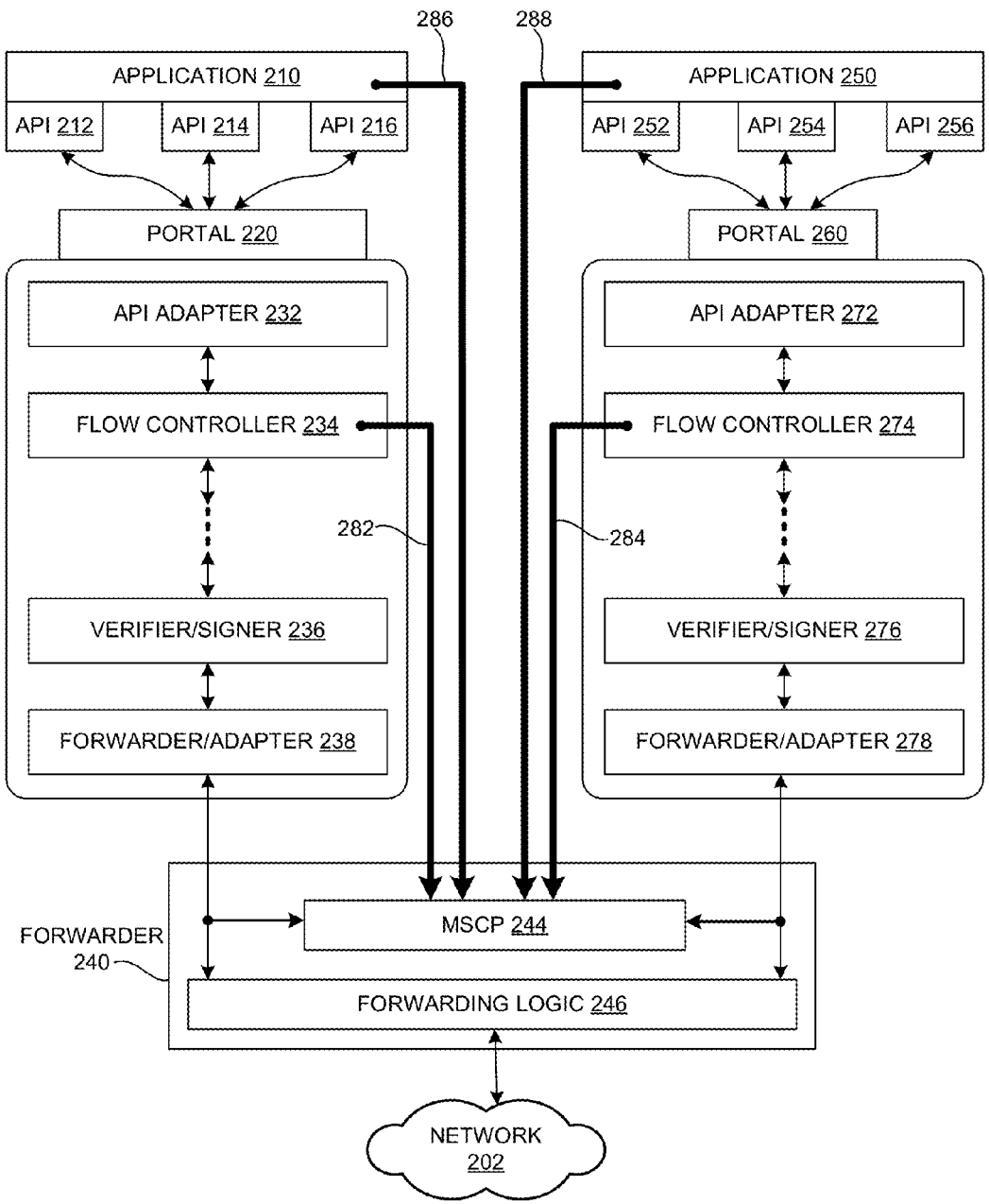
FIG. 2E illustrates an exemplary transport framework which facilitates increased network efficiency by collecting historical network information in a content centric network, wherein a collector component resides in a forwarder as a message stream co-processor element, in accordance with an embodiment of the present invention.

FIG. 2E illustrates an exemplary transport framework which facilitates increased network efficiency by collecting historical network information in a content centric network, wherein a collector component resides in a forwarder as a message stream co-processor element, in accordance with an embodiment of the present invention. The framework in FIG. 2E corresponds to the framework in FIG. 2C, and illustrates an embodiment in which the collector component is a local message stream co-processor. Recall that CCN end-hosts have a single forwarder that services all ingress and egress interest and content objects to and from applications (i.e., incoming interests and corresponding outgoing content objects, and outgoing interests and corresponding incoming content objects). A standard CCN forwarder maintains only a minimal amount of information to forward CCN messages: a forwarding information base ("FIB"), a pending interest table ("PIT"), and an optional content store ("CS" or cache). In this embodiment, forwarder 240 also includes a specific collector component which is a message stream co-processor ("MSCP") 244. The functionality of MSCP 244 is unique to the end-host that it services and may be configured at startup or at runtime. For example, MSCP 244 may be configured to collect and store only historical information regarding interest and content object exchanges, which can include the average number of interests issued for a specific namespace or prefix for a given period of time. Other types of historical information can also be collected and stored, as described herein (e.g., in storage device 242.1, not shown in FIG. 2E).

Because forwarder 240, and thus MSCP 244, processes all messages for all applications on a given system (e.g., a CCN end-host), maintaining the privacy of the messages is a key feature. The operating system can define and limit the functionality of MSCP 244, including the disclosure of collected historical information to authorized entities only. For example, requesting entity application 210 can transmit a query 286 to MSCP 244, and requesting entity flow controller 234 can also transmit a query 282 to MSCP 244. Queries 282 and 286 may include a request for historical information collected by MSCP 244. Since the requesting entities (e.g., application 210 and flow controller 234) are associated with the end host serviced by MSCP 244, MSCP 244 can identify the requesting entities as authorized entities and transmit the requested historical information back in response to queries 282 and 286. Similarly, application 250 and flow controller 274 may, respectively, submit queries 288 and 284 to MSCP 244, and in response receive the requested historical information from MSCP 244.

Thus, MSCP 244 can perform like a black box that consumes CCN messages for processing. The limits of this processing are unbounded. MSCP 244 can provide whatever is needed for its given end-host and associated applications. For example, MSCP 244 may be configured to count the number of processed messages, to log the names of all outgoing interest messages to a system log, or to collect any of the types of historical information described herein.

Exemplary Historical Information

Consider the following sequence of n interest messages issued by different applications on the same end-host, i.e., $I_j$ for $j=1, \ldots, n$:

$I_1 = /a/b1/c1$
$I_2 = /a/b1/c2$
$I_3 = /a/b1/c3$
. . . .
$I_{i-1} = /a/b1/c1$
$I_i = /a/b2/c1$
. . . .
$I_n = /a/b2/fileN$ In a window that includes each of interests $I_j$, the "/a" namespace has n interests, the "/a/b1" namespace has i interests, and the "/a/b2" namespace has (n−i+1) interests. Each of interests $I_j$ has a corresponding content object response, $C_j$.

For each of interests $I_j$, the collector component can collect various types of historical information based on each particular namespace, including the items in the following non-exhaustive list:

1) A round trip time ("RTT") that begins when an outgoing/incoming interest is transmitted and ends when a corresponding incoming/outgoing content object is received;
2) A number of outgoing/incoming interests for which a corresponding incoming/outgoing content object has not been received (e.g., outstanding window size);
3) A number of outgoing/incoming interests for which a corresponding incoming/outgoing content object is received based on a predetermined amount of time or an RTT;
4) A number of bytes correctly retrieved based on a predetermined amount of time or an RTT;
5) A number of outgoing/incoming interests that time out based on a predetermined amount of time or an RTT;
6) A number of outgoing/incoming interests which are retransmitted based on a predetermined amount of time or an RTT;
7) A number of re-transmitted outgoing/incoming interests that time out based on a predetermined amount of time or an RTT;
8) A number of interest return messages received/transmitted based on a predetermined amount of time or an RTT, where an interest return message is identified based on a code indicated in the message;
9) A number of outgoing/incoming interests aggregated based on a predetermined amount of time or an RTT;
10) A number of active upstream paths identified for a given time;
11) A strategy for forwarding or processing packets;
12) A number of transmitted original interests, where an original interest is not a re-transmitted interest, wherein the number of original interests include names that share one or more name prefixes ("correlated") and names that do not share any name prefixes ("uncorrelated"); and
13) A number of active entries in a forwarding information base, where the number of entries include correlated and uncorrelated entries.

Collector Component Collects Historical Network Information

Figure 3:
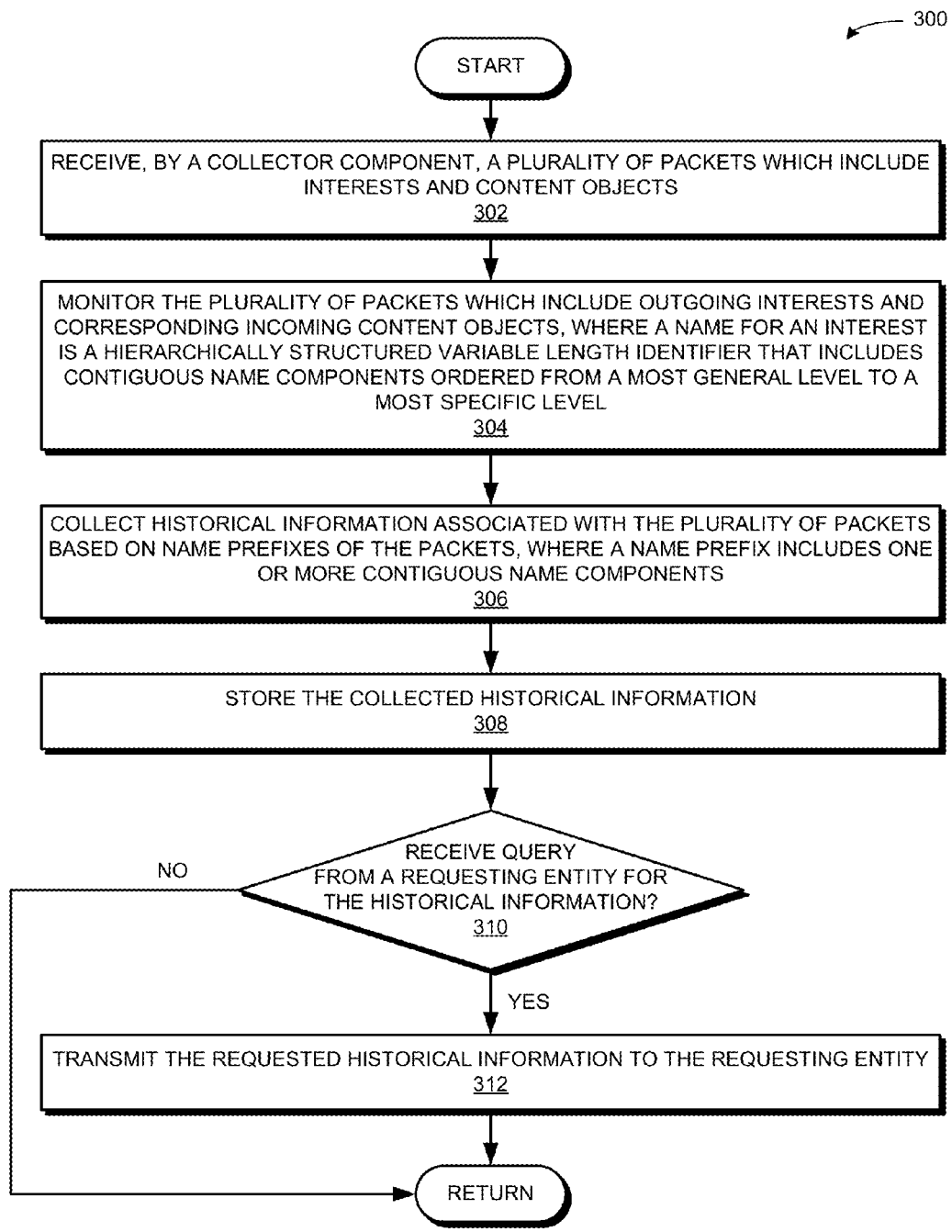
FIG. 3 presents a flow chart illustrating a method by a collector component for facilitating increased network efficiency by collecting historical network information in a content centric network, in accordance with an embodiment of the present invention.

FIG. 3 presents a flow chart 300 illustrating a method by a collector component for facilitating increased network efficiency by collecting historical network information in a content centric network, in accordance with an embodiment of the present invention. During operation, the collector component receives a plurality of packets which are interests and content objects (operation 302). The collector component monitors the plurality of packets which include outgoing interests and corresponding incoming content objects, where a name for an interest is a hierarchically structured variable length identifier that includes contiguous name components ordered from a most general level to a most specific level (operation 304). In some embodiments, the monitored packets include incoming interests and corresponding outgoing content objects. The collector component collects historical information associated with the plurality of packets based on name prefixes of the packets, where a name prefix includes one or more contiguous name components (operation 306). A name may include several prefixes. For example, the name "/a/b/c" includes the following name prefixes: "/a"; "/a/b"; and "/a/b/c." A name prefix may also be referred to as a CCN namespace. The collector component stores the collected historical information (operation 308).

The collector determines whether it receives a query from a requesting entity for the historical information (decision 310). If it does not, the operation ends. If it does receive a query from a requesting entity, the collector component transmits the requested historical information to the requesting entity (operation 312). The query may include a request for stored historical information, including the types of historical information described above. The query may also include authentication information, in which case the collector can authenticate the requesting entity based on the included authentication information. Depending on the identity and authority of the requesting entity, the collector may also sanitize the requested historical information before transmitting it back to the requesting entity.

Requesting Entity Obtains Historical Information

Figure 4:
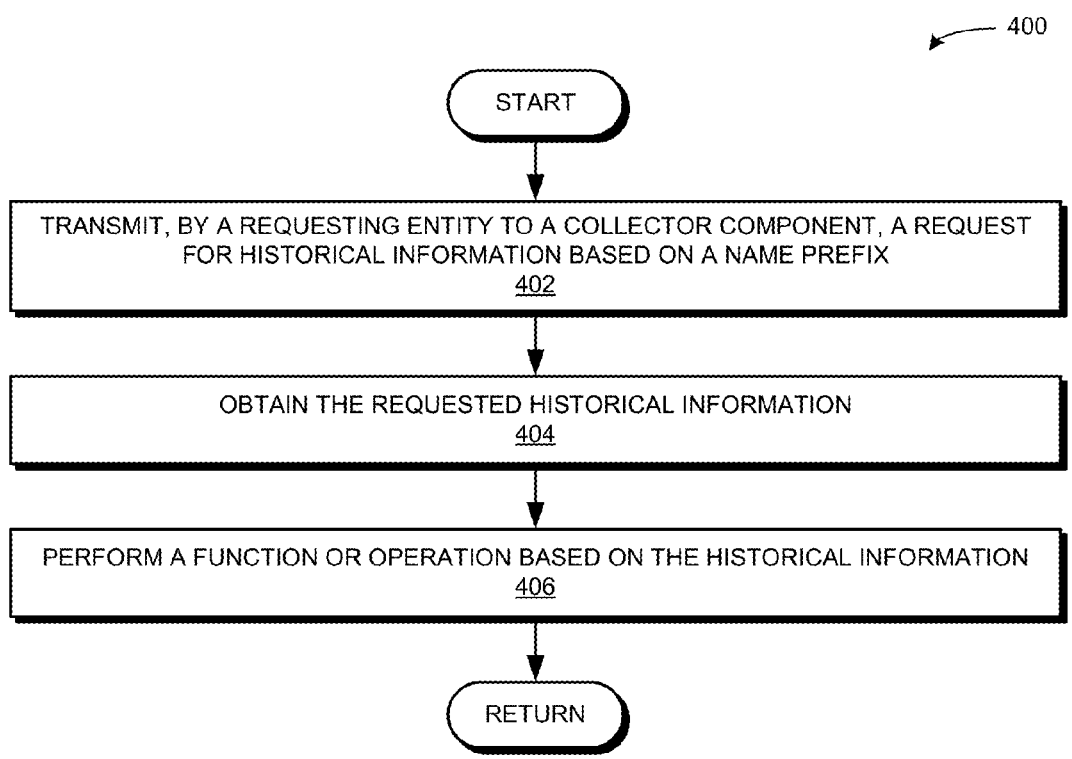
FIG. 4 presents a flow chart illustrating a method by a requesting entity for facilitating increased network efficiency by collecting historical network information in a content centric network, in accordance with an embodiment of the present invention.

FIG. 4 presents a flow chart 400 illustrating a method by a requesting entity for facilitating increased network efficiency by collecting historical network information in a content centric network, in accordance with an embodiment of the present invention. During operation, a requesting entity (such as a stack, a stack component, or an application in a CCN end-host device) transmits a request for historical information based on a name prefix (operation 402). For example, the request may be for an outstanding window size for a given name prefix or namespace over a certain period of time (i.e., the number of outgoing interests for which a corresponding incoming content object has not been received). The requesting entity obtains the requested historical information (operation 404). In response to obtaining the requested historical information, the requesting entity can perform a function or operation based on the historical information (operation 406). For example, if the historical information indicates that the outstanding window size is small (implying that the flow is not congested), the requesting entity may increase its rate of transmission of interests for that namespace. Similarly, if the historical information indicates that the outstanding window size is large (implying congestion), the requesting entity may decrease its rate of interest transmission for that namespace.

Exemplary Computer System

Figure 5:
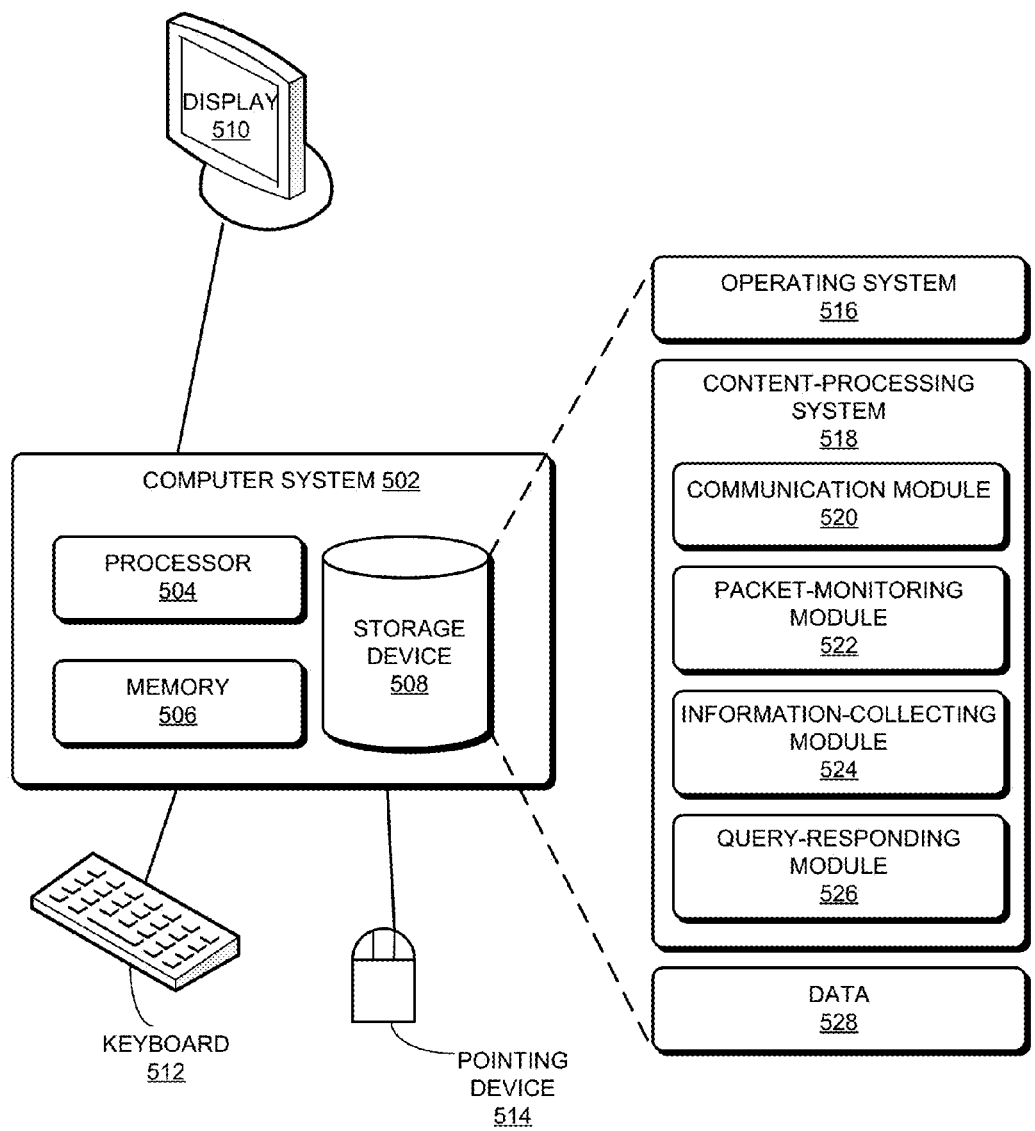
FIG. 5 illustrates an exemplary computer system that facilitates increased network efficiency by collecting historical network information in a content centric network, in accordance with an embodiment of the present invention.

FIG. 5 illustrates an exemplary computer system 502 that facilitates increased network efficiency by collecting historical network information in a content centric network, in accordance with an embodiment of the present invention. Computer system 502 includes a processor 504, a memory 506, and a storage device 508. Memory 506 can include a volatile memory (e.g., RAM) that serves as a managed memory, and can be used to store one or more memory pools. Furthermore, computer system 502 can be coupled to a display device 510, a keyboard 512, and a pointing device 514. Storage device 508 can store an operating system 516, a content-processing system 518, and data 528.

Content-processing system 518 can include instructions, which when executed by computer system 502, can cause computer system 502 to perform methods and/or processes described in this disclosure. Specifically, content-processing system 518 may include instructions for sending and/or receiving data packets to/from other network nodes across a computer network, such as a content centric network (communication module 520). A data packet can include an interest packet or a content object packet with a name that is an HSVLI. Further, content-processing system 518 can include instructions for monitoring a plurality of packets which are outgoing interests and corresponding incoming content objects (packet-monitoring module 522). Content-processing system 518 can include instructions for collecting historical information associated with the plurality of packets based the name prefixes of the packets (information-collecting module 524). Content-processing system 518 can also include instructions for, in response to receiving a query from a requesting entity for the historical information (query-responding module 526), transmitting the historical information (communication module 520).

Data 528 can include any data that is required as input or that is generated as output by the methods and/or processes described in this disclosure. Specifically, data 528 can store at least: a name; a name that is an HSVLI; a name prefix; a namespace; a packet that corresponds to an interest or a content object; a transport framework; a protocol or transport stack; one or more components of a transport or protocol stack; a collector component; a portal instance associated with a transport or protocol stack; historical information (as described above in the section entitled "Exemplary Historical Information"); a round trip time; a predetermined amount of time; a request or query for historical information; a routable name prefix; a time of day; a day of the week; a number of upstream peers retrieving data; a pending interest table; a forwarding information base; and a content store.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described above can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A computer system for facilitating collection of historical network information, the system comprising:
   a processor; and
   a storage device storing instructions that when executed by the processor cause the processor to perform a method, the method comprising:
     monitoring a plurality of packets which include outgoing interests and corresponding incoming content objects, wherein a name for an interest is a hierarchically structured variable length identifier that includes contiguous name components ordered from a most general level to a most specific level;
     collecting historical information associated with the packets based on name prefixes of the packets, wherein a name prefix includes one or more contiguous name components;
     storing the collected historical information;
     receiving a query from a requesting entity for the historical information;
     transmitting the historical information to the requesting entity; and
     facilitating the requesting entity to use the historical information to increase network efficiency;
     wherein the monitored plurality of packets further includes incoming interests and corresponding outgoing content objects.

2. The computer system of claim 1, wherein the method is performed by a collector component in the system, wherein the collector component resides in one or more of:
   an application;
   a single stack;
   a shared stack;
   a single forwarder;
   a shared forwarder; and
   any node in a network.

3. The computer system of claim 2, wherein the requesting entity is one or more of:
   an application associated with a first stack, wherein the collector component resides in the first stack;
   an application associated with a second stack that is different from the first stack;
   a stack component of the first stack, wherein the stack component is different from the collector component;
   a stack component of the second stack; and
   any other element or node in the network.

4. The computer system of claim 1, wherein the historical information associated with the packets is one or more of:
   a round trip time that begins when an outgoing interest is transmitted and ends when a corresponding incoming content object is received;
   a number of outgoing interests for which a corresponding incoming content object has not been received;
   a number of outgoing interests for which a corresponding incoming content object is received based on a predetermined amount of time or the round trip time;
   a number of bytes correctly retrieved based on the predetermined amount of time or the round trip time;
   a number of outgoing interests that time out based on the predetermined amount of time or the round trip time;
   a number of outgoing interests which are retransmitted based on the predetermined amount of time or the round trip time;
   a number of re-transmitted outgoing interests that time out based on the predetermined amount of time or the round trip time;
   a number of interest return messages received based on the predetermined amount of time or the round trip time, wherein an interest return message is received in response to an outgoing interest and is identified based on a code indicated in the message; and
   a number of outgoing interests aggregated based on the predetermined amount of time or the round trip time.

5. The computer system of claim 1, wherein the historical information associated with the packets is one or more of:
   a number of active upstream paths identified for a given time;
   a strategy for forwarding packets;
   a first number of transmitted original interests, wherein an original interest is not a re-transmitted interest, and wherein the first number of original interests include names that share one or more name prefixes;
   a second number of transmitted original interests, wherein the second number of original interests include names that do not share any name prefixes;
   a first number of active entries in a forwarding information base, wherein the first number of entries include names that share one or more name prefixes; and
   a second number of active entries in a forwarding information base, wherein the second number of entries include names that do not share any name prefixes.

6. The computer system of claim 1, wherein the system is a client computing device, an intermediate node, or a content producing device.

7. The computer system of claim 1, wherein collecting the historical information is further based on one or more of:
   one or more name prefixes;
   a routable name prefix which includes one or more contiguous name components beginning from the most general level;
   a time of day;
   a day of the week;
   a number of upstream peers that are retrieving data; and
   a feature based on time or space.

8. The computer system of claim 1, wherein the historical information associated with the packets is one or more of:
   a round trip time that begins when an incoming interest is received and ends when a corresponding incoming content object is transmitted;
   a number of incoming interests for which a corresponding outgoing content object has not been transmitted;
   a number of incoming interests for which a corresponding outgoing content object is transmitted based on a predetermined amount of time or the round trip time;
   a number of bytes correctly retrieved based on the predetermined amount of time or the round trip time;
   a number of incoming interests that time out based on the predetermined amount of time or the round trip time;

a number of re-transmitted incoming interests based on the predetermined amount of time or the round trip time;
a number of re-transmitted incoming interests that time out based on the predetermined amount of time or the round trip time;
a number of interest return messages transmitted based on the predetermined amount of time or the round trip time, wherein an interest return message is transmitted in response to an incoming interest and is identified based on a code indicated in the message; and
a number of incoming interests aggregated based on a predetermined amount of time or a round trip time.

9. A computer-implemented method for facilitating collection of historical network information, the method comprising:
monitoring a plurality of packets which include outgoing interests and corresponding incoming content objects, wherein a name for an interest is a hierarchically structured variable length identifier that includes contiguous name components ordered from a most general level to a most specific level;
collecting historical information associated with the packets based on name prefixes of the packets, wherein a name prefix includes one or more contiguous name components;
storing the collected historical information;
receiving a query from a requesting entity for the historical information;
transmitting the historical information to the requesting entity; and
facilitating the requesting entity to use the historical information to increase network efficiency;
wherein the monitored plurality of packets further includes incoming interests and corresponding outgoing content objects.

10. The method of claim 9, wherein the method is performed by a collector component in a system, wherein the collector component resides in one or more of:
an application;
a single stack;
a shared stack;
a single forwarder;
a shared forwarder; and
any node in a network.

11. The method of claim 10, wherein the requesting entity is one or more of:
an application associated with a first stack, wherein the collector component resides in the first stack;
an application associated with a second stack that is different from the first stack;
a stack component of the first stack, wherein the stack component is different from the collector component;
a stack component of the second stack; and
any other element or node in the network.

12. The method of claim 9, wherein the historical information associated with the packets is one or more of:
a round trip time that begins when an outgoing interest is transmitted and ends when a corresponding incoming content object is received;
a number of outgoing interests for which a corresponding incoming content object has not been received;
a number of outgoing interests for which a corresponding incoming content object is received based on a predetermined amount of time or the round trip time;
a number of bytes correctly retrieved based on the predetermined amount of time or the round trip time;
a number of outgoing interests that time out based on the predetermined amount of time or the round trip time;
a number of outgoing interests which are retransmitted based on the predetermined amount of time or the round trip time;
a number of re-transmitted outgoing interests that time out based on the predetermined amount of time or the round trip time;
a number of interest return messages received based on the predetermined amount of time or the round trip time, wherein an interest return message is received in response to an outgoing interest and is identified based on a code indicated in the message; and
a number of outgoing interests aggregated based on the predetermined amount of time or the round trip time.

13. The method of claim 9, wherein the historical information associated with the packets is one or more of:
a number of active upstream paths identified for a given time;
a strategy for forwarding packets;
a first number of transmitted original interests, wherein an original interest is not a re-transmitted interest, and wherein the first number of original interests include names that share one or more name prefixes;
a second number of transmitted original interests, wherein the second number of original interests include names that do not share any name prefixes;
a first number of active entries in a forwarding information base, wherein the first number of entries include names that share one or more name prefixes; and
a second number of active entries in a forwarding information base, wherein the second number of entries include names that do not share any name prefixes.

14. The method of claim 9, wherein the method is performed by a client computing device, an intermediate node, or a content producing device.

15. The method of claim 9, wherein collecting the historical information is further based on one or more of:
one or more name prefixes;
a routable name prefix which includes one or more contiguous name components beginning from the most general level;
a time of day;
a day of the week;
a number of upstream peers that are retrieving data; and
a feature based on time or space.

16. The method of claim 9, wherein the historical information associated with the packets is one or more of:
a round trip time that begins when an incoming interest is received and ends when a corresponding incoming content object is transmitted;
a number of incoming interests for which a corresponding outgoing content object has not been transmitted;
a number of incoming interests for which a corresponding outgoing content object is transmitted based on a predetermined amount of time or the round trip time;
a number of bytes correctly retrieved based on the predetermined amount of time or the round trip time;
a number of incoming interests that time out based on the predetermined amount of time or the round trip time;
a number of re-transmitted incoming interests based on the predetermined amount of time or the round trip time;
a number of re-transmitted incoming interests that time out based on the predetermined amount of time or the round trip time;

a number of interest return messages transmitted based on the predetermined amount of time or the round trip time, wherein an interest return message is transmitted in response to an incoming interest and is identified based on a code indicated in the message; and a number of incoming interests aggregated based on a predetermined amount of time or a round trip time.

17. A non-transitory computer readable storage media encoded with instructions, that when executed by processor, cause the processor to perform operations for facilitating collection of history network comprising:

monitoring a plurality of packets which include outgoing interests and corresponding incoming content objects, wherein a name for an interest is a hierarchically structured variable length identifier that includes contiguous name components ordered from a most general level to a most specific level;

collecting historical information associated with the packets based on name prefixes of the packets, wherein a name prefix includes one or more contiguous name components;

storing the collected historical information; and in response to receiving a query from a requesting entity for the historical information, transmitting the historical information, thereby facilitating the requesting entity to use the historical information to increase network efficiency;

wherein the monitored plurality of packets further includes incoming interests and corresponding outgoing content objects.

18. The non-transitory computer readable storage media of claim 17, wherein the historical information associated with the packets is one or more of:

a round trip time that begins when an outgoing interest is transmitted and ends when a corresponding incoming content object is received;

a number of outgoing interests for which a corresponding incoming content object has not been received;

a number of outgoing interests for which a corresponding incoming content object is received based on a predetermined amount of time or the round trip time;

a number of bytes correctly retrieved based on the predetermined amount of time or the round trip time;

a number of outgoing interests that time out based on the predetermined amount of time or the round trip time;

a number of outgoing interests which are retransmitted based on the predetermined amount of time or the round trip time; a number of re-transmitted outgoing interests that time out based on the predetermined amount of time or the round trip time;

a number of interest return messages received based on the predetermined amount of time or the round trip time, wherein an interest return message is received in response to an outgoing interest and is identified based on a code indicated in the message; and a number of outgoing interests aggregated based on the predetermined amount of time or the round trip time.

19. The non-transitory computer readable storage media of claim 17, wherein the historical information associated with the packets is one or more of:

a number of active upstream paths identified for a given time: a strategy for forwarding packets;

a first number of transmitted original interests, wherein an original interest is not a re-transmitted interest, and wherein the first number of original interests include names that share one or more name prefixes;

a second number of transmitted original interests, wherein the second number of original interests include names that do not share any name prefixes;

a first number of active entries in a forwarding information base, wherein the first number of entries include names that share one or more name prefixes; and a second number of active entries in a forwarding information base, wherein the second number of entries include names that do not share any name prefixes.

20. The non-transitory computer readable storage media of claim 17, wherein the instructions that cause the processor to perform the collecting the historical information comprise instructions that cause the processor to perform the collector further based on one or more of: one or more name prefixes; a routable name prefix which includes one or more contiguous name components beginning from the most general level; a time of day; a day of the week; a number of upstream peers that are retrieving data; and a feature based on time or space.

* * * * *

UNITED STATES PATENT AND TRADEMARK OFFICE
CERTIFICATE OF CORRECTION

PATENT NO. : 10,051,071 B2
APPLICATION NO. : 15/061817
DATED : August 14, 2018
INVENTOR(S) : Christopher A. Wood et al.

Page 1 of 1

It is certified that error appears in the above-identified patent and that said Letters Patent is hereby corrected as shown below:

In the Claims

Claim 17, Column 17, Line 23, remove "in response to"
Claim 17, Column 17, Line 24, replace "information," with --information;--
Claim 17, Column 17, Line 25, replace "information, thereby" with --information to the requesting entity; and--

Claim 19, Column 18, Line 19, replace "time:" with --time;--

Signed and Sealed this
Twenty-ninth Day of January, 2019

Andrei Iancu
*Director of the United States Patent and Trademark Office*